United States Patent
Motohashi et al.

(10) Patent No.: US 9,859,653 B2
(45) Date of Patent: Jan. 2, 2018

(54) CARD HOLDING MEMBER AND CARD CONNECTOR

(71) Applicant: Molex, LLC, Lisle, IL (US)

(72) Inventors: Nobumasa Motohashi, Yamato (JP); Akihiro Shimotsu, Ebina (JP); Nobuki Ukita, Yamato (JP)

(73) Assignee: Molex, LLC, Lisle, IL (US)

(*) Notice: Subject to any disclaimer, the term of this patent is extended or adjusted under 35 U.S.C. 154(b) by 0 days.

(21) Appl. No.: 14/807,230

(22) Filed: Jul. 23, 2015

(65) Prior Publication Data

US 2016/0036143 A1   Feb. 4, 2016

(30) Foreign Application Priority Data

Aug. 1, 2014 (JP) ................ 2014-157351

(51) Int. Cl.
*H01R 13/62* (2006.01)
*H01R 13/635* (2006.01)
*G06K 13/08* (2006.01)

(52) U.S. Cl.
CPC ........... *H01R 13/635* (2013.01); *G06K 13/08* (2013.01)

(58) Field of Classification Search
CPC .............. G06K 13/08; G06K 13/0806; G06K 13/0812; G06K 13/0862; G06K 13/0831; G06K 13/0805; G06K 13/0856; H01R 13/7132; H01R 4/4827; H01R 43/22; H01R 13/633; H01R 13/6335; H01R 13/62

USPC .................................................. 439/160, 630
See application file for complete search history.

(56) References Cited

U.S. PATENT DOCUMENTS

| 5,286,214 | A | 2/1994 | Takahashi | |
|---|---|---|---|---|
| 8,777,669 | B2* | 7/2014 | Hu | H01R 12/714 439/159 |
| 8,811,025 | B2* | 8/2014 | Kume | G06K 13/085 361/754 |
| 9,147,134 | B2* | 9/2015 | Shimada | G06K 13/085 |
| 2013/0309885 | A1* | 11/2013 | Liu | H01R 13/629 439/153 |
| 2014/0362548 | A1* | 12/2014 | Liu | G06F 1/16 361/754 |
| 2015/0050841 | A1 | 2/2015 | Okoshi et al. | |

FOREIGN PATENT DOCUMENTS

CN   2667725 Y   12/2004
JP   5318392 B2  10/2013

* cited by examiner

*Primary Examiner* — Amy Cohen Johnson
*Assistant Examiner* — Matthew T Dzierzynski
(74) *Attorney, Agent, or Firm* — James A. O'Malley

(57) ABSTRACT

A card holding member is able to hold a card 101 with terminal members and able to be inserted into a card connector. Here, the card holding member includes a frame portion 161 facing a side surface 112 of the card 101, and a movable lock portion provided on the frame portion 161 which is able to engage and disengage a lock portion of the card connector. The movable lock portion is disengaged from the lock portion by an auxiliary portion which activates the ejection mechanism for ejecting the card holding member from the card connector.

18 Claims, 16 Drawing Sheets (a)

(b)

CARD HOLDING MEMBER AND CARD CONNECTOR

RELATED APPLICATIONS

This application claims priority to Japanese Patent Application No. 2014-157351, filed Aug. 1, 2014, which is incorporated herein by reference in its entirety.

FIELD OF THE INVENTION

The present disclosure relates to a card holding member and a card connector.

DESCRIPTION OF RELATED ART

Electronic devices such as personal computers, cell phones, personal digital assistants (PDAs), digital cameras, video cameras, music players, gaming devices and car navigation systems include connectors that allow various types of devices to be used. These include Subscriber Identity Module (SIM) cards, Multi-media Cards® (MMC), Secure Digital® (SD) cards, miniSD® cards, xD-Picture® cards, Memory Sticks®, Memory Stick Duo®, Smart Media®, Trans-Flash® memory cards, and MicroSD® cards.

Electronic devices have become significantly smaller in recent years, and so have cards and card connectors. As a result, it can be difficult for users to grasp a card with the fingers and insert the card properly into a card connector. Already, card connectors have been proposed in which a card is set inside a card connector and the card connector is inserted into the card tray.

FIG. 14 is a diagram showing a card connector of the prior art.

In this drawing, 811 is a housing in a card connector made of an insulating resin material, and 861 is a shell made of a metal sheet which is mounted on the housing 811 so as to cover the housing 811 from above. Also, 961 is a card tray in which a card 901 is mounted. The card tray 961 containing a card 901 is inserted via an insertion slot 818 and housed inside the space formed by the housing 811 and the shell 861. The card 901 has electrode pads (not shown) on the lower surface, and these electrode pads are exposed on the lower surface of the card tray 961.

A cantilevered lock portion 875 is formed in the shell 861 to engage a notched portion 968 formed in the card tray 961 while the card tray 961 is housed in the card connector space. In this way, the card tray 961 is kept from becoming detached from the card connector space.

The housing 811 also includes a push rod and an ejection lever (not shown). When the card tray 961 is to be removed from the card connector space, the user inserts an auxiliary member such as a pin or rod into a through-hole 963a formed in a flange portion 963 of the card tray 961 until the tip of the auxiliary member slides into the push rod. This activates the ejection lever, which displaces the card tray 961 in the forward direction from the inside. In this way, the shell 861, the lock portion 875, and the notched portion 968 of the card tray 961 are disengaged, and the card tray 961 is ejected in the forward direction from the insertion slot 818.

BRIEF SUMMARY

However, in a card connector of the prior art, when the card tray 961 is to be ejected, the lock portion 875 and the notched portion 968 are disengaged while resisting the spring action of the lock portion 875. As a result, sufficient force has to be slidingly applied to the push rod to activate the ejection lever and displace the card tray 961 in the forward direction. Therefore, a relatively large amount of force has to be exerted to slide the push rod using a small auxiliary member, and this makes it difficult to eject the card tray 961.

Because the lock portion 875 and the notched portion 968 are engaged while resisting the spring action of the lock portion 875 when the card tray 961 is inserted, a similar amount of force has to be applied to displace the card tray 961 inward. However, when the user manually pushes in the front surface of the flange portion 963, which is larger than the auxiliary member, it is difficult to insert the card tray 961 even when a fairly large amount of force is exerted.

It is an object of the present disclosure to provide a card holding member and a card connector able to reliably hold the card holding member in the card connector and readily eject the card holding member so that an auxiliary member activated by the ejection mechanism disengages a lock portion when the ejection operation is performed to eject the card holding member from the card connector.

The present disclosure is a card holding member able to hold a card with terminal members and able to be inserted into a card connector, the card holding member comprising a frame portion facing a side surface of the card, and a movable lock portion provided on the frame portion able to engage and disengage a lock portion of the card connector, the movable lock portion being disengaged from the lock portion by an auxiliary portion activating the ejection mechanism for ejecting the card holding member from the card connector.

In another aspect of the card holding member of the present disclosure, the auxiliary member operates the ejection mechanism after operating the movable lock portion and disengaging the lock portion.

In another aspect of the card holding member of the present disclosure, the ejection mechanism includes an operating member able to slide in the insertion and ejection directions of the card holding member, the auxiliary member being a rod-shaped member able to slide in the insertion and ejection directions and to activate the ejection mechanism when the operating member moves in the insertion direction, and the movable lock portion being able to disengage the lock portion when the auxiliary member comes into contact with an operation transferring portion position along the path of the auxiliary member.

In another aspect of the card holding member of the present disclosure, a rear panel portion is connected to the rear of the frame portion, and the auxiliary member is passed through a through-hole formed in the rear panel portion and moved in the insertion direction.

In another aspect of the card holding member of the present disclosure, the frame portion includes side frame portions facing the side ends of the card, and the moveable lock portion is a cantilevered plate spring arranged on a side frame portion and includes a holding protruding portion for engaging the lock portion.

In another aspect of the card holding member of the present disclosure, the frame portion includes an operation transferring portion, and the holding protruding portion is displaced when the auxiliary member comes into contact with the operation transferring portion.

In another aspect of the card holding member of the present disclosure, the plate spring includes an integrally formed operation transferring portion, and the holding protruding portion is displaced when the auxiliary member comes into contact with the operation transferring portion.

In another aspect of the card holding member of the present disclosure, the frame portion includes a rear frame portion facing the rear end of the card, and the moveable lock portion is a cantilevered plate spring arranged on the rear frame portion and includes a holding protruding portion for engaging the lock portion.

The present disclosure is also a card connector able to receive an inserted card holding member able to hold a card with terminal members, the card connector comprising an ejection mechanism for ejecting the card holding member, and a lock portion in the frame portion of the card holding member able to engage and disengage a movable lock portion provided on a frame portion opposing a side surface of the card, and the lock portion being disengaged from the movable lock portion when an auxiliary portion activates the ejection mechanism.

In the present disclosure, a card connector can reliably hold a card holding member in the card connector and readily eject the card holding member so that an auxiliary member activated by the ejection mechanism disengages a lock portion when the ejection operation is performed to eject the card holding member from the card connector.

DETAILED DESCRIPTION

The following is a detailed explanation of embodiments of the present disclosure with reference to the drawings.

Figure 1:
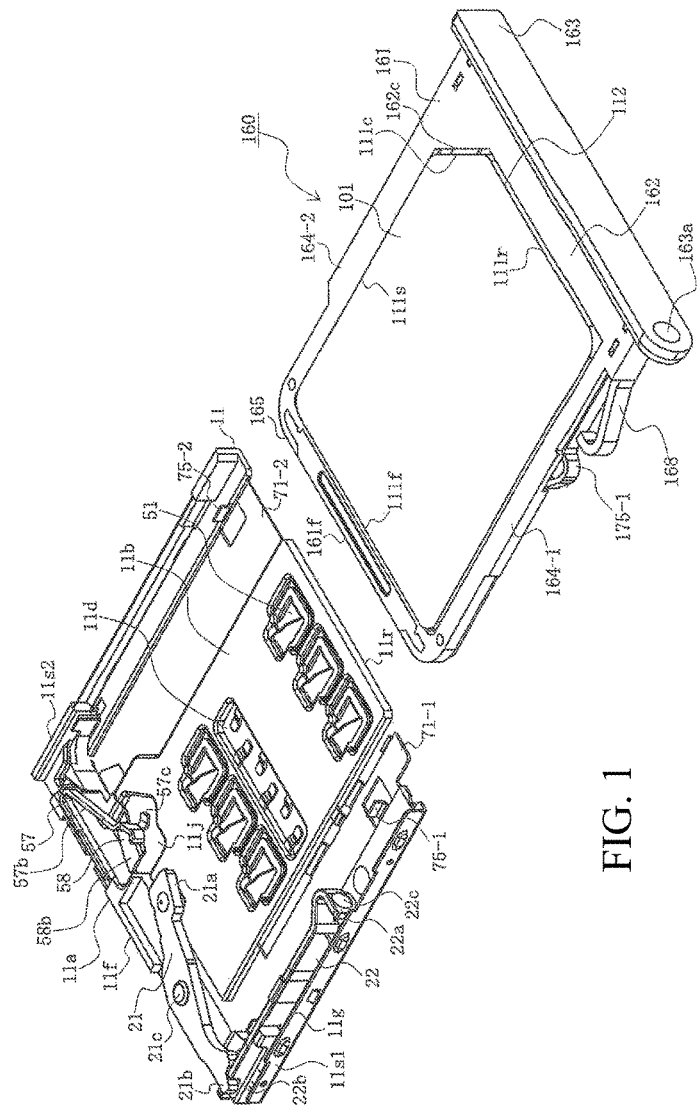
FIG. 1 is a perspective view of the card connector in the first embodiment of the present disclosure with the shell removed to show the situation immediately before the card tray has been inserted.
Figure 2:
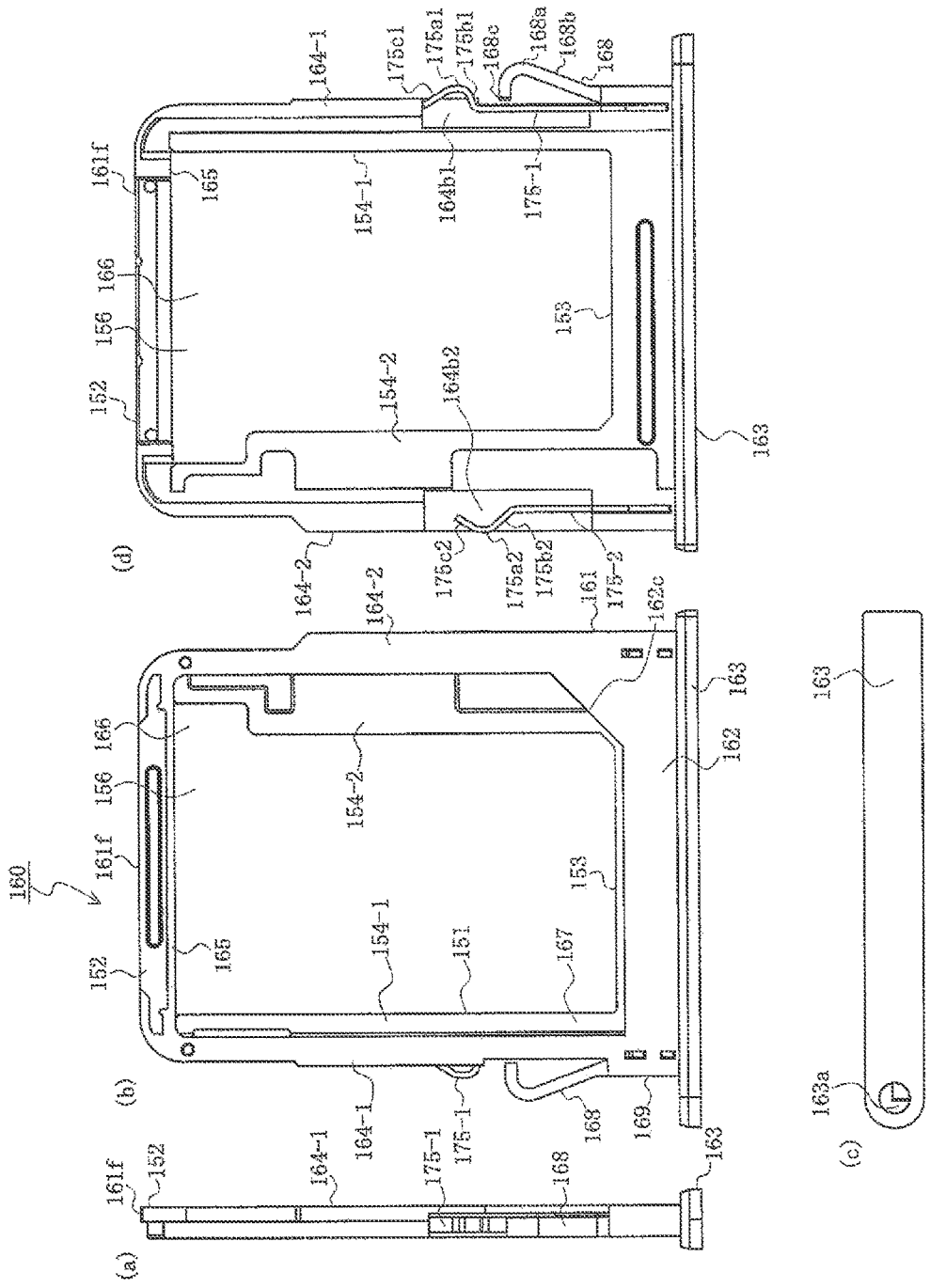
FIG. 2 is four side views of the card tray in the first embodiment of the present disclosure in which (a) is a side view, (b) is a top view, (c) is a rear view, and (d) is a bottom view.
Figure 2A:
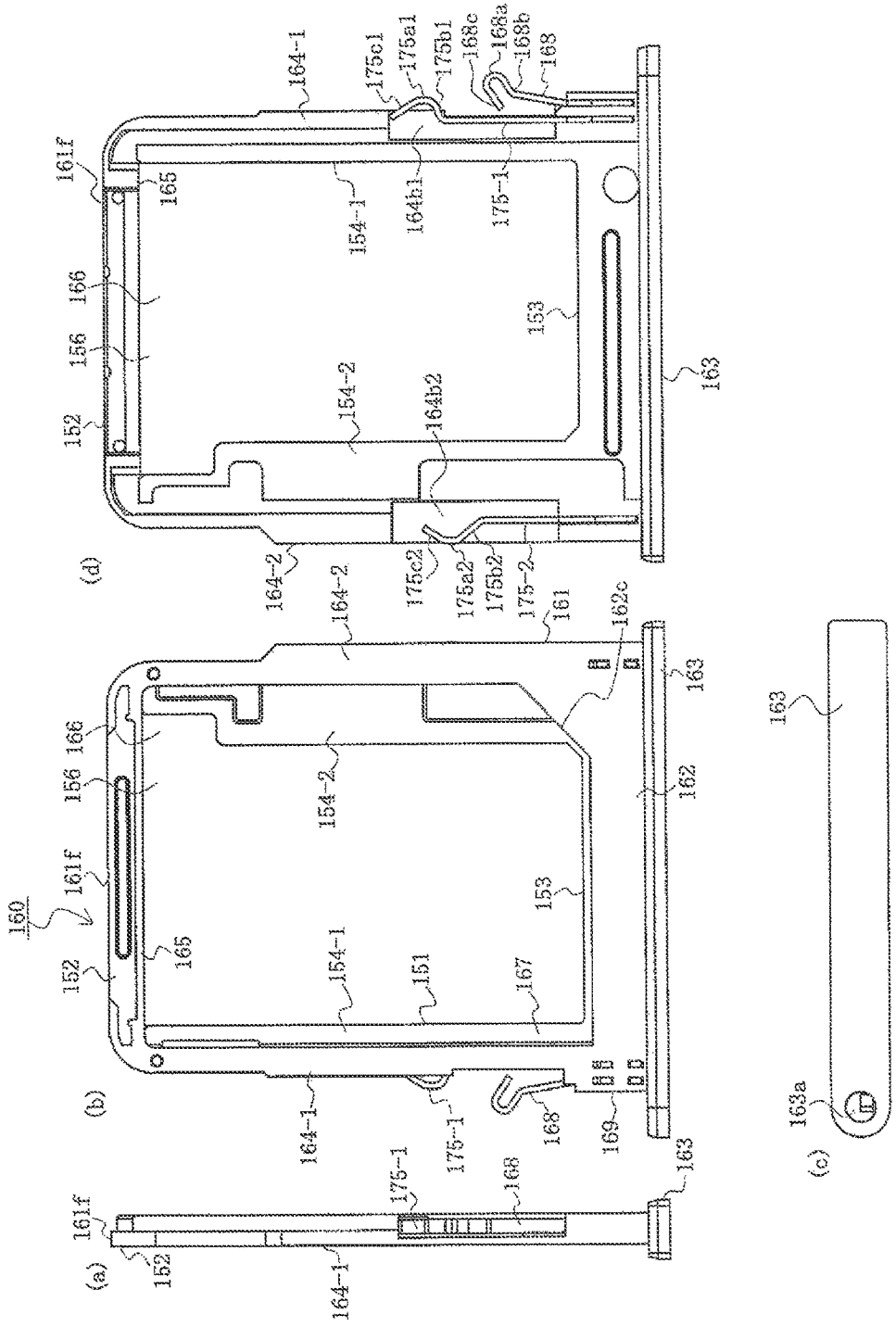
FIG. 2A is four side views of a variation on the card tray in the first embodiment of the present disclosure in which (a) is a side view, (b) is a top view, (c) is a rear view, and (d) is a bottom view.
Figure 2B:
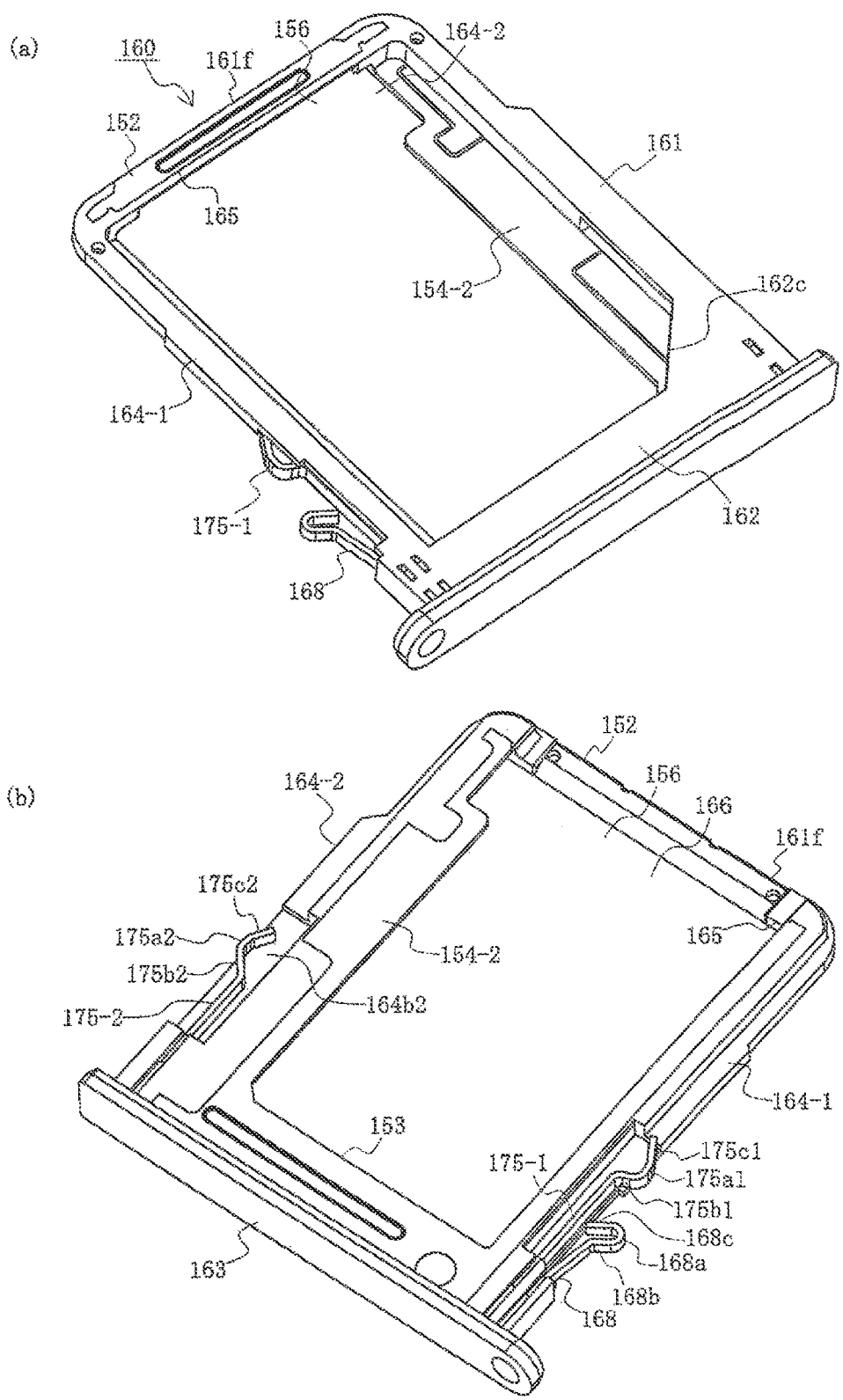
FIG. 2B is a pair of perspective views of a variation on the card tray in the first embodiment of the present disclosure in which (a) is a view from above and (b) is a view from below.
Figure 3:
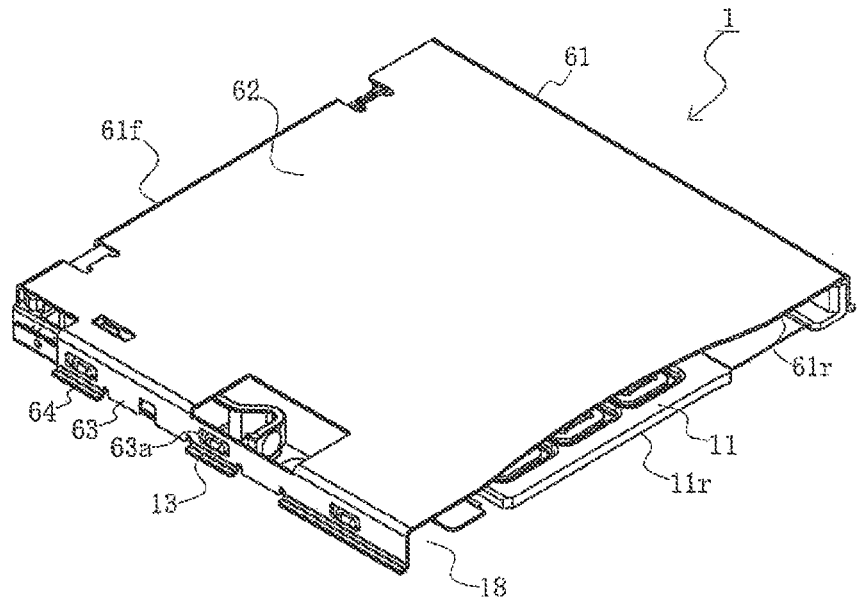
FIG. 3 is a pair of perspective views of the card connector in the first embodiment of the present disclosure in which (a) is the view when the shell is attached and (b) is the view when the shell has been removed.
Figure 3:
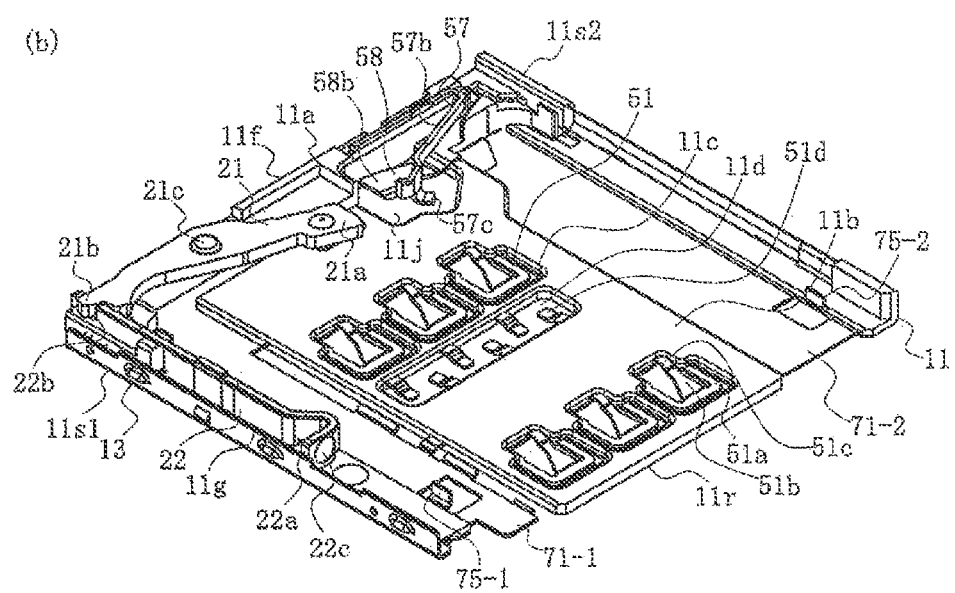

FIG. 1 is a perspective view of the card connector in the first embodiment of the present disclosure with the shell removed to show the situation immediately before the card tray has been inserted, FIG. 2 is four side views of the card tray in the first embodiment of the present disclosure, FIG. 2A is four side views of a variation on the card tray in the first embodiment of the present disclosure, FIG. 2B is a pair of perspective views of a variation on the card tray in the first embodiment of the present disclosure, and FIG. 3 is a pair of perspective views of the card connector in the first embodiment of the present disclosure. In FIG. 2 and FIG. 2A, (a) is a side view, (b) is a top view, (c) is a rear view, and (d) is a bottom view. In FIG. 2B, (a) is a view from above and (b) is a view from below. In FIG. 3, (a) is the view when the shell is attached and (b) is the view when the shell has been removed.

In the drawings, 160 is the card tray serving as the card holding member in the present embodiment. As shown in FIG. 1, it is inserted into a card connector 1 mounted in an electronic device (not shown) while housing a card 101. In other words, a card 101 is accommodated inside the card tray 160 with both side surfaces 112 surrounded by the frame portion 161 facing the side surfaces 112, and is mounted in an electronic device via a card connector 1. The electronic device may be any type of device, including a personal computer, a mobile phone, a communication modem, a PDA, a digital camera, a video camera, a music player, a gaming console, or a car navigation system.

However, when a card connector other than card connector 1 is mounted in an electronic device, the user does not use card connector 1. In this case, the empty card tray 160, that is, the card tray 160 not housing a card 101, can be inserted into the card connector 1 for storage. For convenience of explanation, the shell 61 of the card connector 1 is not depicted in FIG. 1.

The card 101 can be any type of card such as a SIM card, a microSIM card, MMC® card, SD® card, miniSD® card, xD-Picture® card, Memory Stick®, Memory Stick Duo®, Smart Media®, or Trans-Flash® memory card. In the explanation of the present embodiment, the card is a 4th Form Factor (4FF) card or so-called nanoSIM card. In accordance with the ETSI TS 102 221 V11.00 card standard, the nanoSIM card has a longitudinal length of 12.3 mm, a width of 8.8 mm, and a thickness of 0.67 mm.

In the present embodiment, as shown in FIG. 1, the card 101 has a substantially rectangular band-like shape, and electrode pads serving as the terminal members (not shown) are arranged in two rows of three along the front end 111f and the rear end 111r on the lower surface. In other words, the electrode pads are arranged in two rows extending in the transverse direction of the card 101. Electrode pads are not provided on the upper surface, that is, on the side opposite the terminal accommodating surface. A notched portion 111c, which is notched on an inclined angle, is formed on either corner connecting the right or the left end of the rear end 111r to a side end 111s.

In the present embodiment, the expressions indicating direction, such as upper, lower, left, right, front and rear, which are used to explain the configuration and operation of each portion of the card connector 1, card tray 160, and card 101, are relative and not absolute. They depend on the orientation of the connector 1, card tray 160, and card 101, and their constituent components shown in the drawings. When the orientation of the connector 1, card tray 160, and card 101 or their constituent components changes, the interpretation changes in response to the change in orientation.

Here, the card tray 160 has an integrally formed metal portion 151 obtained by punching and bending a conductive metal plate, and a resin portion 169 molded from an insulating resin using a molding method such as insertion molding or overmolding so as to cover and become integrated with at least a portion of the outer periphery of the metal portion 151.

As shown in FIG. 2, the metal portion 151 is a substantially rectangular frame member surrounding all four sides of a substantially rectangular opening 156 which is able to expose the electrode pads of the card 101. It has a rear metal frame portion 153 and a front metal frame portion 152 extending parallel to each other in the transverse direction, and a first metal side frame portion 154-1 and a second metal side frame portion 154-2 extending in the longitudinal direction and connected to both ends of the rear metal frame portion 153 and the front metal frame portion 152. When referred to collectively, the first metal side frame portion 154-1 and the second metal side frame portion 154-2 are referred to as the metal side frame portions 154.

The frame portion 161 of the card tray 160 is a substantially rectangular frame member surrounding all four sides of a space 166 serving as the card accommodating space for accommodating a card 101, and has a rear frame portion 162 and a front frame portion 165 extending parallel to each other in the transverse direction, and a first side frame portion 164-1 and a second side frame portion 164-2 extending in the longitudinal direction and connected to both ends of the rear frame portion 162 and the front frame portion 165. When referred to collectively, the first side frame portion 164-1 and the second side frame portion 164-2 are referred to as the side frame portions 164.

An inclining portion 162c is formed in a corner at which the second side frame portion 164-2 is connected to the rear frame portion 162, that is, in the rear right corner. The inclining portion 162c functions as a card orientation regulating portion. When the card 101 is inserted with the proper orientation as shown in FIG. 1, it allows the card 101 to be inserted into the card tray 160. However, when the card 101 does not have the proper orientation, it does not allow the card 101 to be inserted into the card tray 160. In other words, it does not allow the card 101 to be housed in the space 166.

A rear panel portion 163 is connected to the rear of the rear frame portion 162. The dimension of the rear panel portion 163 in the thickness direction of the card tray 160 (in the vertical direction in FIG. 2 (a)) is greater than that of the rear frame portion 162, the front frame portion 165, and the side frame portion 164. Both ends of the rear panel portion 163 protrude outward in the transverse direction of the card tray 160 from the rear frame portion 162 and the front frame portion 165. In this way, the rear panel portion 163 is designed to stop erroneous insertion when the card tray 160 is inserted into the card connector 1 upside down. It also allows for easier handling and operation when the user of the card connector 1 inserts the card tray 160 manually.

A through-hole 163a is also formed in both ends of the rear panel portion 163 which passes through the rear panel portion 163 in the thickness direction. The through-hole 163a is a hole passing through the auxiliary member 181 when the operating portion 22a of the push rod 22 of the card connector 1 is used to apply pressure via the auxiliary member 181, which can be a pin or a rod. The auxiliary member 181 activates the ejection mechanism for ejecting the card tray 160 from the card connector 1.

With the exception of the rear panel portion 163, the upper surfaces of the rear frame portion 162, the side frame portions 164, and the front frame portion 165 are flush with each other and are formed so as to have equal dimensions in the thickness direction of the card tray 160 (the lateral direction in FIG. 2 (a)). An eaves portion 167 protrudes into the space 166 from the inner bottom end of the rear frame portion 162 and the left and right side frame portions 164. The eaves portions 167 function as card supporting portions for supporting at least some of the lower surface of a card 101 housed inside the space 166, such as near the side edges.

The side surfaces of the front frame portion 165, the rear frame portion 162, the side frame portion 164, and the front frame portion 165 facing into the space 166, that is, the inner side surfaces, are all coated with an insulating resin, and the metal portion 151 is not exposed. Therefore, the metal portion 151 does not establish any contact even though the peripheral edges of the electrode pads on the lower surface of the card 101 housed inside the space 166 are exposed to the side surfaces 112 of the card 101 (the surfaces connecting the lower surface and the upper surface and extending in the direction orthogonal to the lower surface and the upper surface).

In the present embodiment, a first holding member 175-1, which is a spring member serving as the movable lock portion, is mounted in the rear portion of first side frame portion 164-1, that is, in the portion near the rear frame portion 162 in order to hold a card tray 160 inserted into the card connector 1, and a second holding member 175-2, which is a spring member serving as an auxiliary movable lock portion, is mounted in the rear portion of the second frame portion 164-2, that is, in the portion near the rear frame portion 162.

The first holding member 175-1 is able to lock and unlock, that is, engage and disengage from, the first holding engaging piece 75-1 serving as the fixed lock portion for the card connector 1. More specifically, the first holding member 175-1 is a metal band with spring action which extends in the longitudinal direction so that the base end is fixed to the rear end portion of the first side frame portion 164-1, that is, the portion connected to the rear frame portion 162, and the other end is positioned inside a first recessed portion 164b1 formed in the first side frame portion 164-1. As a result, the first holding member 175-1 functions as a cantilevered plate spring fixed at the base end, and the portion positioned inside the first recessed portion 164b1 is elastically displaced inwardly in the transverse direction of the card tray 160.

The first holding member 175-1 bulges outwardly in the transverse direction of the card tray 160 and includes a first holding protruding portion 175a1 near the free end to engage the first holding engaging piece 75-1 in the card connector 1. More specifically, the first holding protruding portion 175a1 includes a first rearward inclining portion 175b1 positioned to the rear and a first forward inclining portion 175c1 positioned in the front, and the first rearward inclining portion 175b1 engages the first holding engaging piece 75-1 when the insertion of the card connector 1 into the card tray 160 has been completed.

An operating portion 168 is mounted in the rear portion of the first side frame portion 164-1, that is, in the portion near the rear frame portion 162. This serves as an operating transferring portion which elastically displaces the first holding protruding portion 175a1 of the first holding member 175-1 and disengages the first holding engaging piece 75-1 of the card connector 1.

The operating portion 168 is a resin member integrally formed with the resin portion 169, which is positioned to the outside of the first holding member 175-1 in the transverse direction of the card tray 160, and extends in the longitudinal direction. The base end is integrally secured to the rear end portion of the first side frame portion 164-1, that is, the portion connected to the rear frame portion 162, and the other end is positioned, in relation to the longitudinal direction, between the base end of the first holding member 175-1 and the first holding protruding portion 175a1. The operating portion 168 functions as a cantilevered spring plate which is fixed at the base end and is elastically displaced in the transverse direction of the card tray 160.

The operating portion 168 also includes a protruding portion for the engagement release operation 168a near the free end which bulges outwardly in the transverse direction of the card tray 160 and comes into contact with the auxiliary member 181 which, in turn, applies pressure to the operating portion 22a of the push rod 22 of the card connector 1. More specifically, the protruding portion for the engagement release operation 168a includes an inclining portion for the engagement release operation 168b positioned in the rear and a leading end portion for the engagement release operation 168c positioned in the front and facing inwardly in the transverse direction of the card tray 160. When pressure is applied to the operating portion 22a of the push rod 22 of the card connector 1 via the auxiliary member 181 and the leading end of the auxiliary member 181 moves forward along the inclining portion for the engagement release operation 168b, the leading end portion for the engagement release operation 168c applies pressure to the first holding member 175-1 inwardly in the transverse direction of the card tray 160, displaces the first holding protruding portion 175a1 inwardly in the transverse direction of the card tray 160, and disengages from the first holding engaging piece 75-1 of the card connector 1.

The operating portion 168 does not have to be a resin member integrally formed with the resin portion 169. As shown in FIG. 2A and FIG. 2B, it may be a member that is separate from the resin portion 169 but mounted on the resin portion 169. In other words, like the first holding member 175, this may be a metal or resin band with spring action which extends in the longitudinal direction so that the base end is fixed to the rear end portion of the first side frame portion 164-1, that is, the portion connected to the rear frame portion 162. The operating portion 168 shown in FIG. 2A and FIG. 2B has the same structure as the operating portion 168 integrally formed with the resin portion 169 shown in FIG. 1 and FIG. 2, and further explanation of the components denoted by the same reference numbers has been omitted. Because it also operates in the same way, further explanation of the operation has also been omitted.

The second holding member 175-2 is a metal band with spring action which extends in the longitudinal direction so that the base end is fixed to the rear end portion of the second side frame portion 164-2, that is, the portion connected to the rear frame portion 162, and the other end is positioned inside a second recessed portion 164b2 formed in the second side frame portion 164-1. As a result, the second holding member 175-2 functions as a cantilevered plate spring fixed at the base end, and the portion positioned inside the second recessed portion 164b2 is elastically displaced inwardly in the transverse direction of the card tray 160.

The second holding member 175-2 bulges outwardly in the transverse direction of the card tray 160 and includes a second holding protruding portion 175a2 near the free end to engage the second holding engaging piece 75-2 in the card connector 1. More specifically, the second holding protruding portion 175a2 includes a second rearward inclining portion 175b2 positioned to the rear and a second forward inclining portion 175c2 positioned in the front, and the second rearward inclining portion 175b2 of the card connector 1 engages the second holding engaging piece 75-2 when the insertion of the card connector 1 into the card tray 160 has been completed.

In the present embodiment, as shown in FIG. 3, the card connector 1 has a housing 11 integrally molded from an insulating material such as a synthetic resin, and a shell 61 or cover member formed integrally by punching and bending a conductive metal sheet which is attached to the upper side of the housing 11. The shell 61 covers at least some of the upper portion of the card tray 160 inserted into the housing 11 and the card connector 1. The card connector 1 has a substantially flat three-dimensional rectangular shape. It is mounted in an electronic device and has an insertion slot 18 in the rear (the lower right in FIG. 3 (a)) for receiving an inserted card tray 160 into the housing 11. More specifically, the card tray 160 is inserted into the card insertion space formed between the housing 11 and the shell 61.

As shown in FIG. 3 (b), the housing 11 has a bottom wall portion 11b which is a substantially rectangular band-like member, and an inner wall portion 11a rising from the bottom wall portion 11b and extending along the front end portion 11f of the housing 11, that is, along the front end portion in the insertion direction of the card tray 160. The rear end portion of the housing 11 in the insertion direction of the card tray 160 is referred to as the rear end portion 11r.

The housing 11 has a first flange portion 71-1 and a second flange portion 71-2 extending from the left and right sides of the bottom wall portion 11b to the outside in the transverse direction. The first flange portion 71-1 and the second flange portion 71-2 are panel members that are thinner than the bottom wall portion 11b and the lower surfaces of the flange portions are flush with the lower surface of the bottom wall portion 11b.

Here, the bottom wall portion 11b has a terminal holding recessed portion 11c for holding the terminals 51. The terminal holding recessed portions 11c are openings passing through the bottom wall portion 11b in the thickness direction, and are arranged in parallel rows that extend in the transverse direction of the housing 11. In the example shown in the drawing, there are two rows of three openings each. In other words, the terminal holding recessed portions 11c and the terminal 51 held in each of the terminal holding recessed portions 11c are arranged so as to form two rows that extend in the transverse direction of the housing 11. At least some of the base portion 51a of each terminal 51 is embedded in the bottom wall portion 11b, and the rest exposed inside the terminal holding recessed portions 11c.

Each terminal 51 has cantilevered contact arm portion 51b connected at the base end to the base portion 51a, and a contact portion 51c connected to the tip or free end of the contact arm portion 51b. At least the upper surface of the contact portion 51c is higher than the upper surface of the bottom wall portion 11b when a card 101 housed in a card tray 160 has not been inserted into the card insertion space. The portion of each terminal 51 including the contact arm portion 51b and the contact portion 51c has a side surface which rises closer to the front end portion 11f, that is extends forward at an angle. The contact arm portion 51b and the contact portion 51c are inside a terminal holding recessed portion 11c when viewed from above. The contact portion 51c of each terminal 51 is arranged so as to come into contact with an electrode pad on the card 101 in the card tray 160 inserted into the card connector 1. Therefore, the number and arrangement of terminals 51 has to be changed to match the number and arrangement of electrode pads on the card 101.

Also, a solder tail opening 11d is formed in the bottom wall portion 11b which passes through in the thickness direction. The solder tail portion 51d is exposed in the solder tail opening 11d as the base connecting portion of each terminal 51. Each solder tail portion 51d is connected to the base portion 51a of each terminal 51 via a coupling portion (not shown) embedded in the bottom wall portion 11b. Each solder tail portion 51d is then connected electrically via solder to a terminal member such as a signal line, contact pad, or terminal formed on the circuit board of the electronic device.

The housing 11 has a first side wall portion 11s1 and a second side wall portion 11s2. The first side wall portion 110 and the second side wall portion 11s2 may be made of an insulating material and integrally formed with a component such as the bottom wall portion 11b or may be a metal panel in which the edges of the first flange portion 71-1 and the second flange portion 71-2 have been bent. A tray ejecting rod housing portion 11g is formed in the first side wall portion 11s1. A push rod 22 serving as an ejection operation unit is slidably mounted in the tray ejecting rod housing portion 11g for ejecting a card tray 160 inserted inside the card connector 1. The push rod 22 can slide in the longitudinal direction along the first side wall portion 11s1. The first side wall portion 11s1 and the second side wall portion 11s2 are sometimes referred to collectively below as the side wall portions 11s.

The push rod 22 is a substantially linear rod-shaped or band-shaped member which has a bent operating portion 22a in the rear end portion. The operating portion 22a has a shape that is easy to operate when the user manually manipulates the card connector 1 via the auxiliary member 181 described below. A recessed portion 22c may be formed in the rear surface of the operating portion 22a so as to conform better to the tip of the auxiliary member 181.

An engaging portion 22b is formed in the front end portion of the push rod 22 to engage the force input portion 21b of the ejection lever 21. The ejection lever 21, which is the tray ejecting lever in the tray ejection mechanism, is a lever-shaped member arranged near the inner wall portion 11a. As a result, the ejection lever 21 is mounted on the bottom wall portion 11b so as to pivot on the fulcrum portion 21c. The end portion of the ejection lever 21 opposite the force input portion 21b with the fulcrum portion 21c between them makes contact with the front end 161f of the card tray 160 inserted into the card connector 1, and functions as the force output portion 21a imparting force to the card tray 160 in the ejection direction.

A first holding engaging piece 75-1 is formed in the first flange portion 71-1 to engage the first holding protruding portion 175a1 on the first holding member 175-1 of the card tray 160 inserted into the card connector 1. More specifically, the first holding engaging piece 75-1 is an immovable fixed member formed by cutting out a portion of the first flange portion 71-1, and is positioned below the operating portion 22a of the push rod 22 relative to the insertion direction of the card tray 160.

Similarly, a second holding engaging piece 75-2 is formed in the second flange portion 71-2 to engage the second holding protruding portion 175a2 on the second holding member 175-2 of the card tray 160 inserted into the card connector 1. More specifically, the second holding engaging piece 75-2 is an immovable fixed member formed by cutting out a portion of the second flange portion 71-2. The second holding engaging piece 75-2 can be omitted when the card tray 160 does not have a second holding member 175-2.

The shell 61 has a substantially rectangular ceiling panel portion 62 and side panel portions 63 erected on the side edges of the ceiling panel portion 62. A plurality of engaging openings 63a are formed in the side panel portions 63. When the shell 61 is mounted on the housing 11 from above, these engaging openings 63a engage the engaging protrusions 13 formed on the outer walls of the side wall portions 11s of the housing 11 to secure the shell 61 to the housing 11. Solder tail portions 64 are erected at spots on the lower end of the side panel portions 63, and serve as substrate connecting portions which extend outward in the transverse direction of the shell 61. The solder tail portions 64 are secured by soldering to an anchoring pad formed on the surface of the printed circuit board in the electronic device. The front and rear end portions of the shell 61 in the insertion direction of the card tray 160 are referred to as the front end portion 61f and the rear end portion 61r. The structure of the first holding engaging piece 75-1 and the second holding engaging piece 75-2 explained above included a first flange portion 71-1 and a second flange portion 71-2, but the first holding engaging piece 75-1 and the second holding engaging piece 75-2 can also be formed by cutting out C-shaped portions for inserting the ceiling panel portion 62 of the shell 61.

The card connector 1 also has a detection switch terminal for detecting a card tray 160 that has been inserted into the card connector 1. More specifically, a tray detection switch terminal is arranged near the front end portion 11f of the housing 11 to detect the insertion of a card tray 160 to a predetermined position inside the card connector 1 (the position at which the card tray 160 is held by the holding members 75 and reliable contact has been established with the contact portions 51c of the terminals 51 corresponding the electrode pads when a card 101 is housed inside the card tray 160). The tray detection switch has a first contact member 57, which is a cantilevered terminal attached at or near the front end portion 11*f*, and a second contact member 58, which is a terminal held by a switch holding recessed portion 11*j* formed in the bottom wall portion 11*b*. The switch holding recessed portion 11*j* is an opening passing through the bottom wall portion 11*b* in the thickness direction.

The following is an explanation of the operations performed to insert a card tray 160 with this configuration into a card connector 1 and then eject it from the card connector 1.

Figure 4:
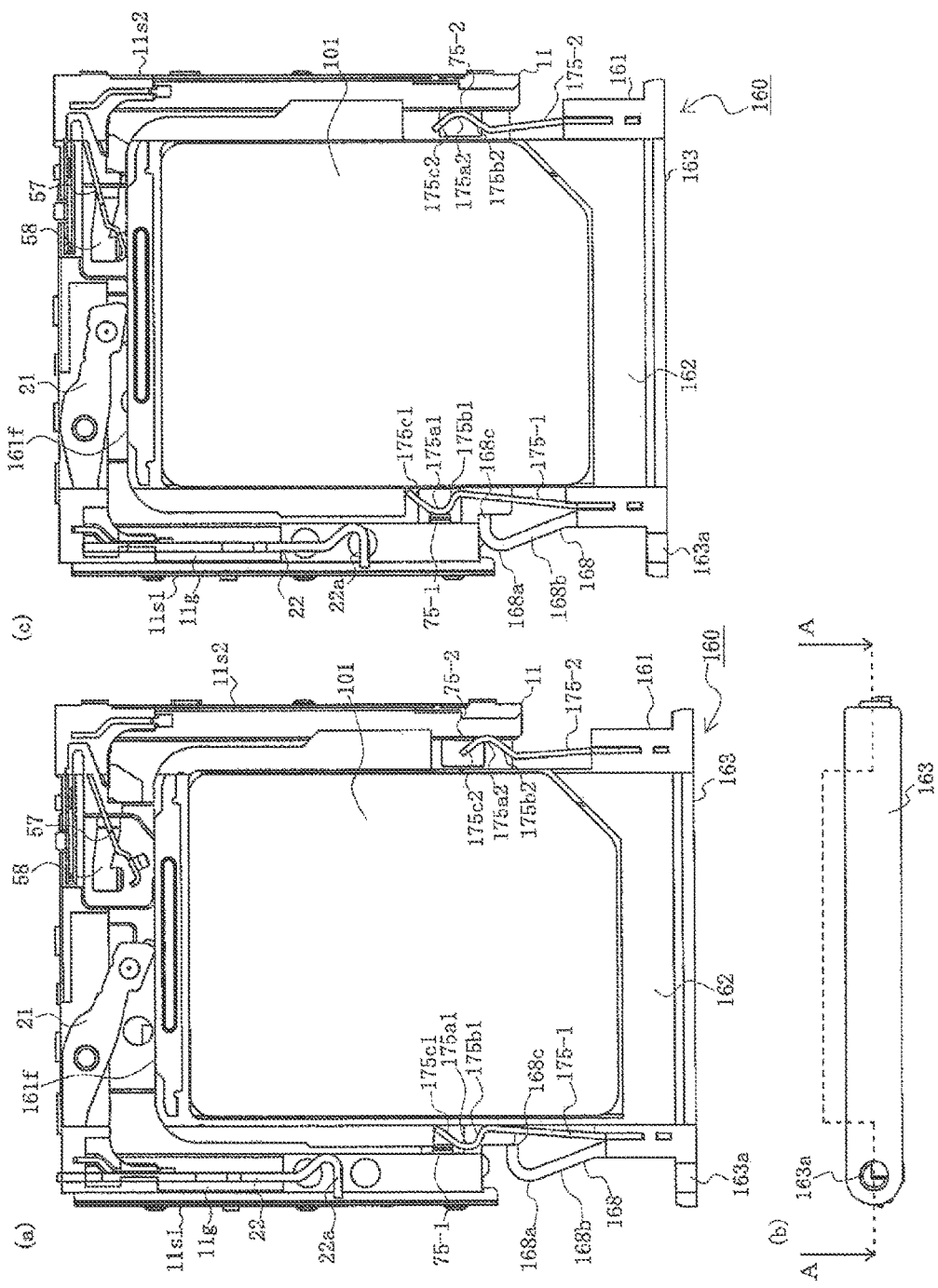
FIG. 4 is a set of perspective views of the card connector in the first embodiment of the present disclosure with the shell removed to explain the operations performed to insert the card tray into the card connector in which (a) is a view of the first step, (b) is an explanatory view showing a partial cross-section of the rear view in (a), and (c) is a view of the second step.
Figure 5:
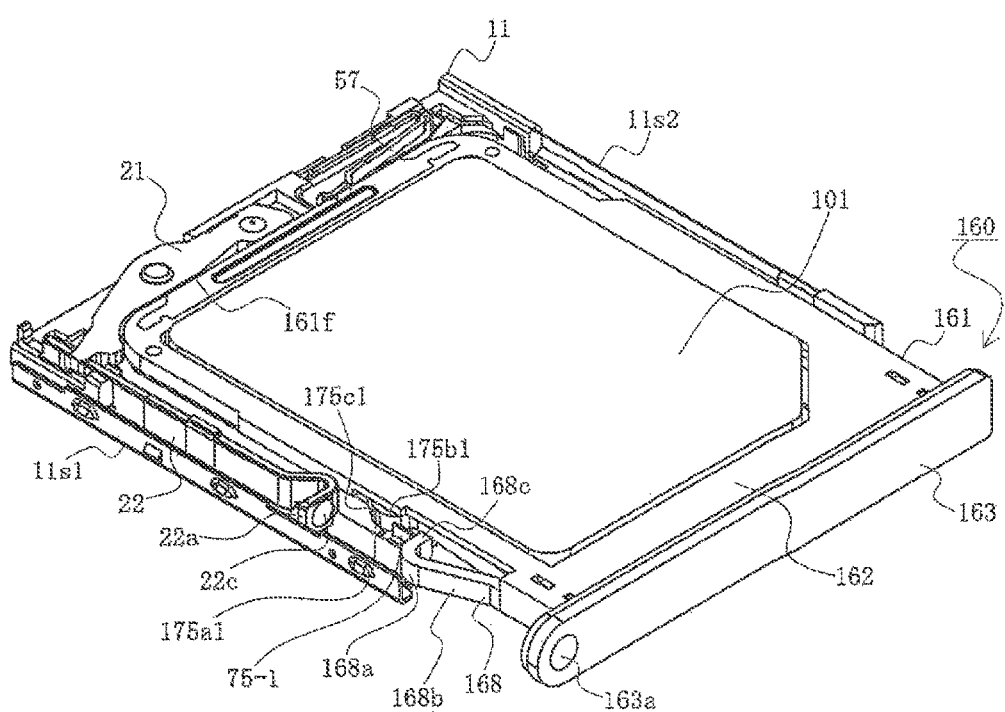
FIG. 5 is a perspective view of the card connector in the first embodiment of the present disclosure with the shell removed to show the inserted card tray.
Figure 6:
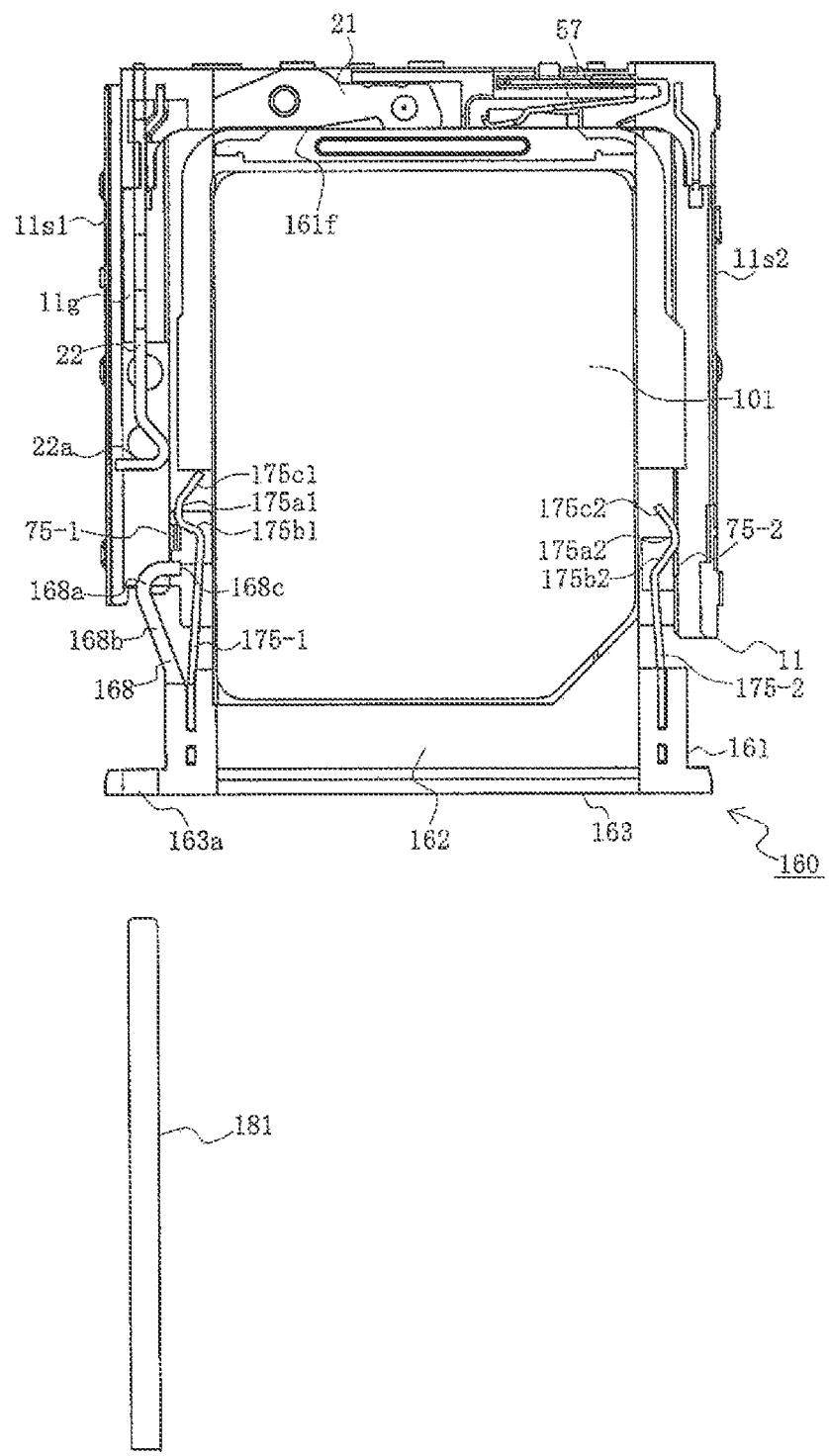
FIG. 6 is a partial cross-sectional top view of the card connector in the first embodiment of the present disclosure with the shell removed to show the situation immediately before the card tray is ejected.
Figure 7:
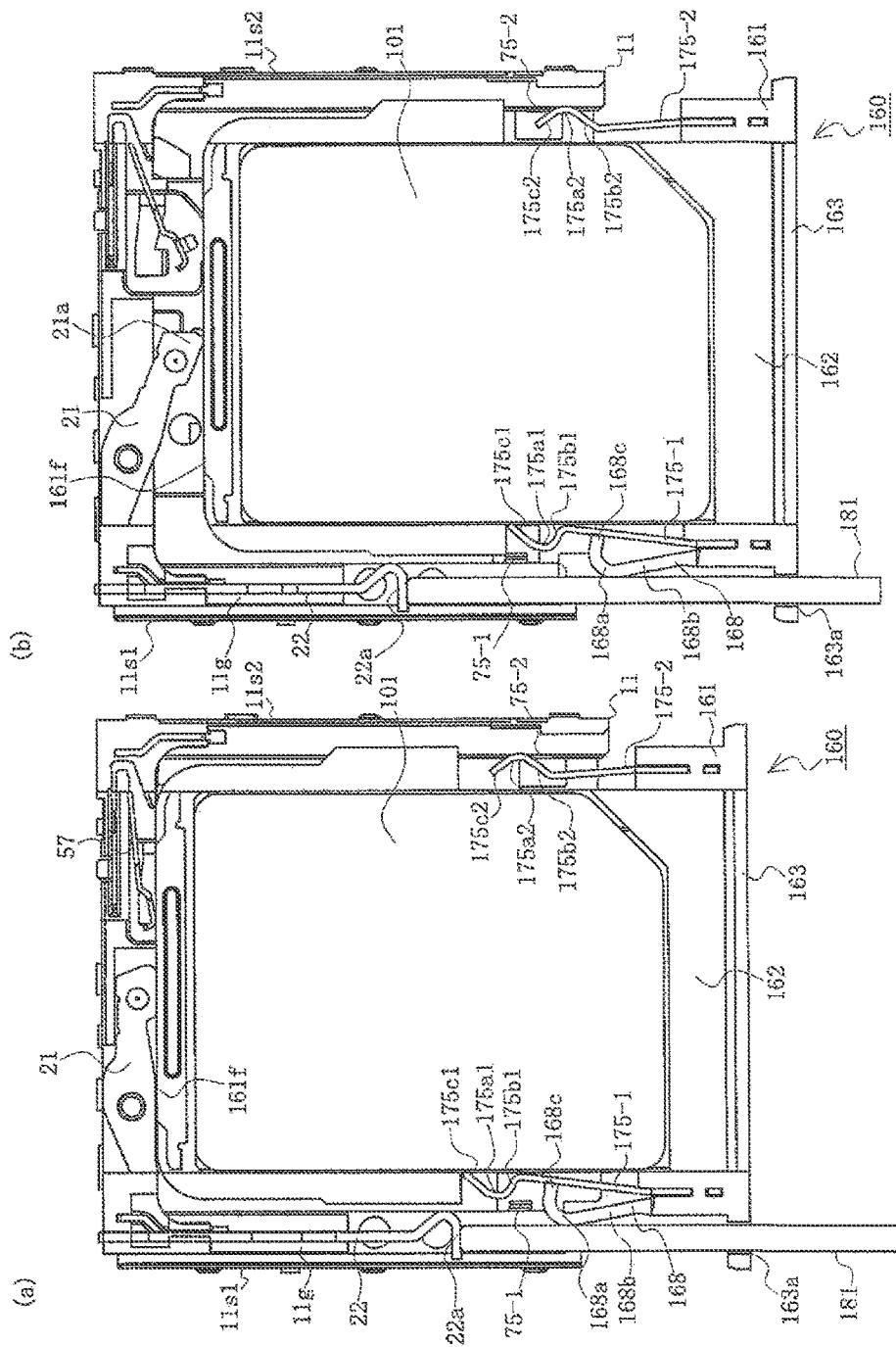
FIG. 7 is a pair of partial cross-sectional top views of the card connector in the first embodiment of the present disclosure with the shell removed to show the operations performed to eject the card tray in which (a) and (b) are views of the steps performed.

FIG. 4 is a set of perspective views of the card connector in the first embodiment of the present disclosure with the shell removed to explain the operations performed to insert the card tray into the card connector. FIG. 5 is a perspective view of the card connector in the first embodiment of the present disclosure with the shell removed to show the inserted card tray. FIG. 6 is a partial cross-sectional top view of the card connector in the first embodiment of the present disclosure with the shell removed to show the situation immediately before the card tray is ejected. FIG. 7 is a pair of partial cross-sectional top views of the card connector in the first embodiment of the present disclosure with the shell removed to show the operations performed to eject the card tray. In FIG. 4, (a) is a view of the first step, (b) is an explanatory view showing a partial cross-section of the rear view in (a), and (c) is a view of the second step. In FIG. 7, (a) and (b) are views of the steps performed.

First, the operations performed to insert the card tray 160 will be explained. As mentioned above, the card tray 160 can be inserted into and ejected from the card connector 1 even when the tray does not include a card 101. In this explanation, the tray is housing a card 101.

First, as shown in FIG. 1, the user manually places a card tray 160 housing a card 101 near the card insertion slot 18 in the rear of the card connector 1. In FIG. 1, the shell 61 has been removed for explanatory purposes.

Here, the card tray 160 is inserted properly, that is, the upper surface is facing upward, that is, facing the ceiling panel portion 62 of the shell 61, and the front frame portion 165 is facing the front end portion 61*f* of the shell 61. Therefore, when the card 101 is housed inside the card tray 160, the lower surface with the electrode pads is exposed and facing downwards, the terminals 51 are facing the bottom wall portion 11*b* of the housing 11, and the front end 111*f* is facing the front end portion 61*f* of the shell 61.

When the card tray 160 is inserted via the insertion slot 18 into the card insertion space formed between the housing 11 and the shell 61, the card tray 160 enters the card insertion space with the lower surfaces of the first side frame portion 164-1 and the second side frame portion 164-2 approaching or making contact with the upper surface of the first flange portion 71-1 and the second flange portion 71-2.

Next, as shown in FIG. 4 (*a*), the first forward inclining portion 175*c*1 in the first holding protrusion portion 175*a*1 of the first holding member 175-1 and the second forward inclining portion 175*c*2 in the second holding protrusion portion 175*a*2 of the second holding member 175-2 of the card tray 160 come into contact, respectively, with the first holding engaging piece 75-1 of the first flange 71-1 and the second holding engaging piece 75-2 of the second flange portion 71-2 of the card connector 1. Because the first forward inclining portion 175*c*1 and the second forward inclining portion 175*c*2 are inclined so as to extend outward in the transverse direction from front to rear, when the card tray 160 moves forward while making contact with the first holding engaging piece 75-1 and the second holding engaging piece 75-2, as shown in FIG. 4 (*a*), the first holding protrusion portion 175*a*1 and the second holding protrusion portion 175*a*2 are elastically deformed inwardly in the transverse direction.

At this time, the card tray 160 receives resistance due primarily to the spring action of the elastically deformed first holding member 175-1 and the second holding member 175-2, but the resistance is less than the pressure being applied by the user's finger so the tray moves forward despite the resistance.

Next, when the user pushes in the card tray 160 further, as shown in FIG. 4 (*c*), the apex of the first holding protruding portion 175*a*1 and the apex of the second holding protruding portion 175*a*2 come into contact, respectively, with the first holding engaging piece 75-1 and the second holding engaging piece 75-2, and the inward displacement of the first holding protruding portion 175*a*1 and the second holding protruding portion 175*a*2 in the transverse direction reaches the maximum point.

In this state, as shown in FIG. 4 (*c*), the front end 161*f* of the card tray 160 already in contact with the force output portion 21*a* of the ejection lever 21 is displaced in front of the force output portion 21*a*. As a result, the force input portion 21*b* of the ejection lever 21 is displaced in the direction of the rear end portion 11*r*, and the push rod 22, which includes an engagement portion 22*b* to engage the force input portion 21*b* slides in the direction of the front end 161*f* of the card tray 160. The free end of the main body portion 57*b* of the first contact member 57 also comes into contact with the front end 161*f* of the card tray 160.

Next, when the user pushes in the card tray 160 even further, as shown in FIG. 5, the card tray 160 reaches a predetermined position in the card connector 1. At this time, the front end 161*f* is pressed against, the free end of the first contact member 57 is displaced in the direction of the front end portion 11*f*, and the first contact member 57 comes into contact with the second contact member 58. Here, the first contact member 57 and the second contact member 58 make contact and the tray detection switch is turned on, and it is detected that the card tray 160 has reached a predetermined position in the card connector 1.

When the card tray 160 moves beyond the predetermined position in the card connector 1, the force output portion 21*a* of the ejection lever 21 presses against the front end 161*f* and is further displaced in the direction of the front end portion 11*f*. As a result, the force input portion 21*b* of the ejection lever 21 is further displaced in the direction of the rear end portion 11*r*, and the push rod 22 slides to the point closest to the rear end portion 11*r*. As shown in FIG. 5, even when the push rod 22 is closest to the rear end portion 11*r*, the operating portion 22*a* is positioned further forward than the first holding engaging piece 75-1 and the first holding protruding portion 175*a*1 of the card tray 160, that is, closer to the front end portion 11*f*.

When the card tray 160 has reached a predetermined position in the card connector 1, the force output portion 21*a* of the ejection lever 21 interferes with the inner wall portion 11*a* of the housing 11 and can no longer be displaced in the direction of the upper front end 11*f*. Therefore, the card tray 160 itself can no longer advance.

When the card tray 160 reaches a predetermined position in the card connector 1, the first rearward inclining portion 175*b*1 in the first holding protrusion portion 175*a*1 of the first holding member 175-1 and the second rearward inclining portion 175*b*2 in the second holding protrusion portion 175*a*2 of the second holding member 175-2 of the card tray 160 come into contact, respectively, with the first holding engaging piece 75-1 of the first flange 71-1 and the second holding engaging piece 75-2 of the second flange portion 71-2 of the card connector 1. Because the first rearward inclining portion 175b1 and the second rearward inclining portion 175b2 are inclined so as to extend inward in the transverse direction from front to rear, when the first holding engaging piece 75-1 and the second holding engaging piece 75-2 make contact, the spring action of the first holding member 175-1 and the second holding member 175-2 exerts force forward from the first holding engaging piece 75-1 and the second holding engaging piece 75-2 so as to return them to their original shape. As a result, the card tray 160 is stably retained and locked in a predetermined position and is kept from becoming displaced in the direction of the rear end portion 11r from the predetermined position.

When the card 101 is housed inside the card tray 160, the card 101 along with the card tray 160 is held in the predetermined position so that data can be exchanged with a computing means in the electronic device containing the card connector 1. When the card 101 is held in the predetermined position, the contact portions 51c of the terminals 51 on the card connector 1 make contact and establish an electrical contact with the contact pads on the card 101.

As mentioned above, the card connector 1 is mounted and used in an electronic device. The card connector 1 is preferably installed inside the case of the electronic device and a tray insertion slot formed in the case to receive an inserted card tray 160. In this way, the card tray 160 can be passed through the tray insertion slot in the case and into the card connector 1 inside the case. When the card tray 160 has been inserted and reaches a predetermined position inside the card connector 1, the rear surface of the rear panel portion 163 is preferably flush with the outer surface of the case. When the card tray 160 has reached the predetermined position in the card connector 1, a portion of the rear panel portion 163 preferably comes into contact with a portion of the case which functions as a stopper to prevent further movement of the card tray 160 forward. A separate member functioning as a stopper can also be provided on the card connector 1 to make contact with a portion of the card tray 160.

The following is an explanation of the operations performed to eject the card tray 160 from the card connector 1.

In the present embodiment, the user operates the auxiliary member 181 shown in FIG. 6 in order to apply pressure to the operating portion 22a of the push rod 22. The auxiliary member 181 can be a slender rod-shaped member such as a pin or rod. In the following explanation, it is a linear rod-shaped member made of metal.

First, as shown in FIG. 6, the user manually operates the auxiliary member 181, and the auxiliary member 181 is passed from the rear of the card tray 160 into a through-hole 163a formed in the rear panel portion 163.

Next, when the user pushes the auxiliary member 181 forward, as shown in FIG. 6, the operating portion 168 of the card tray 160 protrudes over a line connecting the through-hole 163a to the operating portion 22a of the push rod 22, that is, the path of the auxiliary member 181. As a result, the auxiliary member 181 comes into contact with the operating portion 168 and displaces the protruding portion for the engagement release operation 168a inward in the transverse direction. Because, at this time, the inclining portion for the engagement release operation 168b positioned to the rear is inclining outward in the transverse direction as it advances from the rear to the front, when the auxiliary member 181 moves forward while making contact with the inclining portion for the engagement release operation 168b, the protruding portion for the engagement release operation 168a is displaced smoothly inward in the transverse direction.

As shown in FIG. 7 (a), when the protruding portion for the engagement release operation 168a is displaced inward in the transverse direction by the auxiliary member 181, the leading end portion for the engagement release operation 168c facing inward in the transverse direction comes into contact with the first holding member 175-1, presses the first holding member 175-1 inward in the transverse direction, and displaces the first holding protruding portion 175a1 inward in the transverse direction of the card tray 160. In this way, the first holding protruding portion 175a1 and the first holding engaging piece 75-1 of the card connector 1 are disengaged, and the card tray 160 can be displaced from the predetermined position towards the rear end portion 11r.

Because the protruding portion for the engagement release operation 168a is positioned to the rear of the operating portion 22a of the push rod 22a, as shown in FIG. 7 (a), the leading end of the auxiliary member 181 comes into contact with the operating portion 22a, and the operating portion 22a begins to apply pressure in the forward direction. At this point, the engagement release operation 168a has already been displaced inwardly in the transverse direction by the auxiliary member 181, and the first holding protruding portion 175a1 and the first holding engaging piece 75-1 become disengaged.

Because the operating portion 168 displaced by contact with the auxiliary member 181 and the first holding member 175-1 displaced by contact with the operating portion 168 are located on the card tray 160, maintenance costs are minimized because only the card tray 160 has to be replaced or repaired when the operating portion 168 and/or the first holding member 175-1 are damaged. If the operating portion 168 and the first holding member 175-1 were located on the card connector 1 and the first holding engaging piece 75-1 were located on the card tray 160, the card connector 1 would have to be removed from the electronic device and replaced or repaired if the operating portion 168 and/or first holding member 175-1 were damaged. This would take more time and effort, and would entail higher maintenance costs.

When the user pushes in the auxiliary member 181 further, the push rod 22 reaches its maximum forward position, and the force output portion 21a of the ejection lever 21 is displaced to the position shown in FIG. 7 (b). In this way, the force output portion 21a of the ejection lever 21 is pressed against by the front end 161f, and the card tray 160 is displaced from the predetermined position towards the rear end portion 11r to the position shown in FIG. 7 (b).

Because, at this time, the first holding protruding portion 175a1 and the first holding engaging piece 75-1 have been disengaged, the card tray 160 can be displaced smoothly from the predetermined position towards the rear end portion 11r. The second holding protruding portion 175a2 and the second holding engaging piece 75-2 have not been disengaged but, because the first holding protruding portion 175a1 and the first holding engaging piece 75-1, which is one of the two spots at which the card tray 160 engages the card connector 1, have been disengaged, force applied from the force output portion 21a of the ejection lever 21 to the front end portion 161f easily disengages the second holding protruding portion 175a2 and the second holding engaging piece 75-2. Because the inclination of the second rearward inclining portion 175b2 making contact with the second holding engaging piece 75-2 is more gradual than that of the first rearward inclining portion 175b1, the force required to disengage the second holding protruding portion 175*a*2 and the second holding engaging piece 75-2 is smaller than the force required to disengage the first holding protruding portion 175*a*1 and the first holding engaging piece 75-1. As a result, the second holding protruding portion 175*a*2 and the second holding engaging piece 75-2 are easily disengaged.

As a result, the rear panel portion 163 of the card tray 160 protrudes sufficiently from the insertion slot 18 of the card connector 1, and the user can manually grasp the rear panel portion 163 and pull out the card tray 160 from the card connector 1.

In this explanation, the card tray 160 includes a second holding member 175-2 which functions as an auxiliary holding spring. However, the second holding member 175-2 can be omitted. This reduces the ability to prevent displacement of the card tray 160 from the predetermined position towards the rear end portion 11*r*. However, when the card tray 160 is ejected from the card connector 1, no force is required to disengage the second holding member 175-2 from the second holding engaging piece 75-2. This makes displacement of the card tray 160 from the predetermined position towards the rear end portion 11*r* smoother and easier.

In the present embodiment, the card tray 160 is able to hold a card 101 with electrode pads and is able to be inserted into a card connector 1. The card tray 160 includes a frame portion 161 facing the side surfaces 112 of the card 101 and a first holding member 175-1 able to engage and disengage from a first holding engaging piece 75-1 on the card connector 1. Here, the first holding member 175-1 is disengaged from the first holding engaging piece 75-1 by an auxiliary member 181 which operates the ejection mechanism for ejecting the card tray 160 from the card connector 1.

In this way, the card tray 160 can be reliably held inside the card connector 1 and easily ejected from the card connector 1. As a result, the tray is much more reliable.

Also, an auxiliary member 181 operates the ejection mechanism after he first holding member 175-1 has been operated and disengaged from the first holding engaging piece 75-1. As a result, the lock on the card tray 160 is released just as the ejection mechanism is operated. As a result, the card tray 160 is smoothly ejected from the predetermined position towards the rear end portion 11*r*.

The ejection mechanism includes a push rod 22 which can slide in the insertion and ejection directions of the card tray 160. The auxiliary member 181 is a rod-shaped member able to slide in the insertion and ejection directions, the ejection mechanism is operated by the push rod 22 moving in the insertion direction, and the first holding engaging piece 75-1 is from the first holding member 175-1 when the auxiliary member 181 comes into contact with the operating portion 168 positioned in the path of the auxiliary member 181. Because the card tray 160 is unlocked when the ejection operation is performed, the card tray 160 can be easily ejected.

Also, a rear panel portion 163 is connected to the rear of the frame portion 161, and the auxiliary member 181 moves through the through-hole 163*a* formed in the rear panel portion 163 in the insertion direction. Because the auxiliary member 181 is guided by the through-hole 163*a*, it reliably follows its path and comes into contact with the operating portion 168.

In addition, the frame portion 161 includes side frame portions 164 facing the side ends 111*s* of the card 101, and the first holding member 175-1 is a cantilevered plate spring located on a side frame portion 164 which includes a first holding protruding portion 175*a*1 for engaging the first holding engaging piece 75-1. As a result, the first holding member 175-1 has a simple configuration yet is able to reliably engage and disengage the first holding engaging piece 75-1.

Also, the frame portion 161 includes an operating portion 168 and the first holding protruding portion 175*a*1 is displaced when the auxiliary member 181 comes into contact with the operating portion 168. As a result, the first holding protruding portion 175*a*1 can be placed somewhere other than the path of the auxiliary member 181 which increases design freedom.

The following is an explanation of a second embodiment of the present disclosure. The structure is similar to that of the first embodiment so explanation of components denoted by the same reference numbers as those used in the previous embodiment has been omitted. Explanation of all operations and effects identical to those of the first embodiment has also been omitted.

Figure 8:
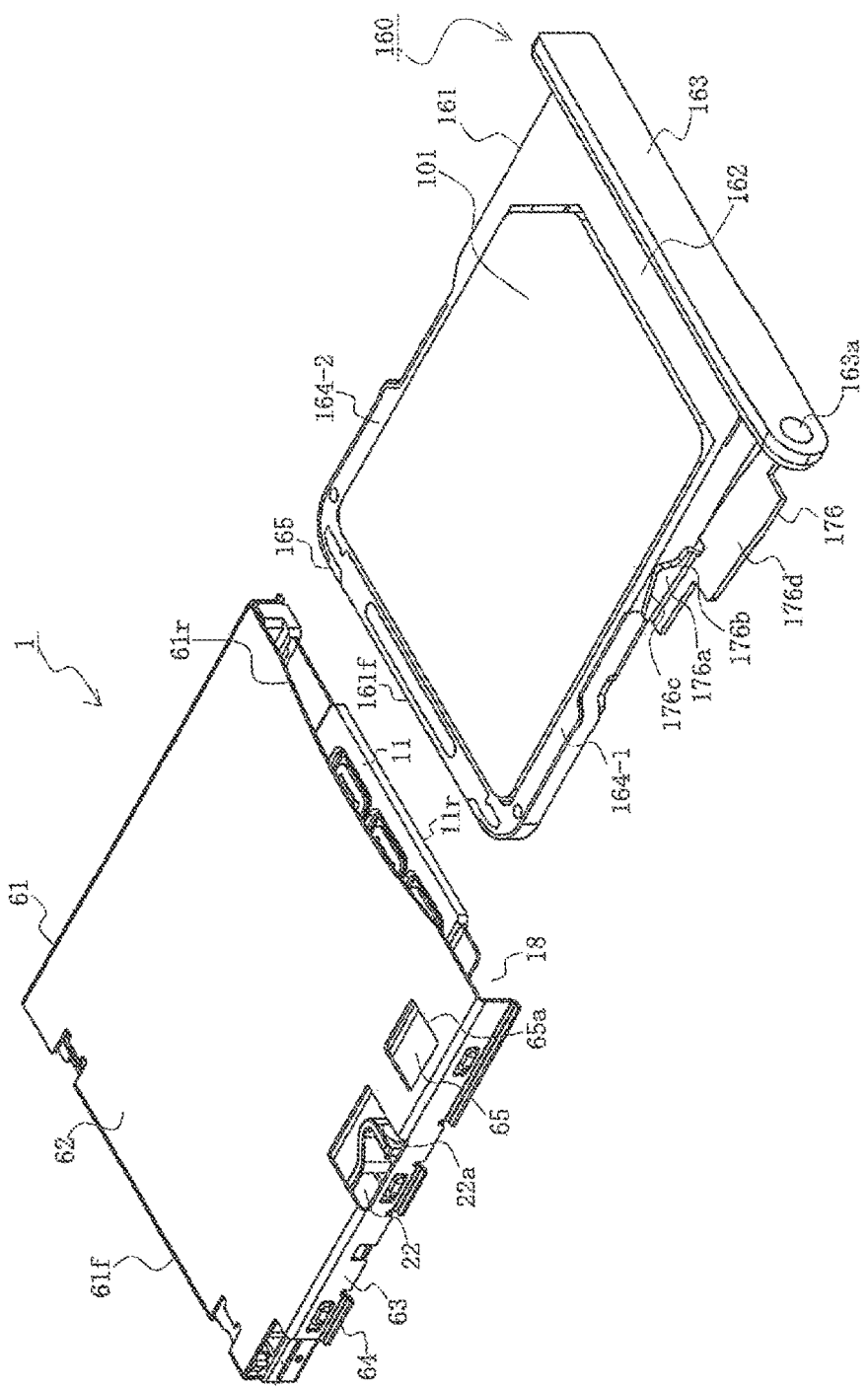
FIG. 8 is a perspective view of the card connector in the second embodiment of the present disclosure showing the situation immediately before the card tray is inserted.

FIG. 8 is a perspective view of the card connector in the second embodiment of the present disclosure showing the situation immediately before the card tray is inserted.

Because the card 101 in the present embodiment is identical to the card 101 in the first embodiment, further explanation has been omitted.

The card connector 1 of the present embodiment does not have a first holding engaging piece 75-1 and a second holding engaging piece 75-2 formed in a first flange portion 71-1 and a second flange portion 71-2. Instead, a holding engaging opening 65 is formed as a fixed lock portion in the ceiling panel portion 62 of the shell 61. The holding engaging opening 65 is positioned above the holding member 176 in the card tray 160 inserted into the card connector 1 as a movable lock portion. The edge of the holding engaging opening 65 near the rear end portion 61*r* functions as an engaging edge portion 65*a*. Because the rest of the configuration of the card connector 1 in the present embodiment is identical to that of the first embodiment, further explanation has been omitted.

As in the case of the card tray 160 in the present embodiment, the card tray 160 in the present embodiment is formed by punching and bending a metal sheet to obtain the metal portion 151 and at least a portion is integrally coated with an insulating resin using a molding technique such as insert molding or overmolding. However, it differs from the card tray 160 in the first embodiment in that there is no first holding member 175-1, second holding member 175-2, or operating portion 168, and in that there is a holding member 176 serving as the movable lock portion for holding the card tray 160 inserted into the card connector 1.

The holding member 176 is a metal band with spring action which extends in the longitudinal direction with the base end fixed to the rear end portion of the first side frame portion 164-1, that is, the portion connected to the rear frame portion 162, and the other end is positioned to the outside in the transverse direction of the first side frame portion 164-1. The base end of the holding member 176 may be integrally connected to the metal portion 151. As a result, the holding member 176 functions as a cantilevered plate spring secured at the base end, and the portion positioned to the outside in the transverse direction of the first side frame portion 164-1 is elastically displaced in the thickness direction of the card tray 160, that is, the vertical direction.

The holding member 176 has a holding protruding portion 176*a* near the free end which engages the holding engaging opening 65 of the card connector 1. More specifically, the holding protruding portion 176*a* is a triangular piece formed by bending upward the side edge portion extending in the longitudinal direction near the free end of the flat holding member 176, and has a rearward inclining portion 176*b* positioned in the rear and a forward inclining portion 176*c* positioned in the front. When the card tray 160 has been completely inserted into the card connector 1, the rearward inclining portion 176*b* engages the engaging edge portion 65*a* of the holding engaging opening 65. The apex of the holding protrusion 176*a* projects above the upper surface of the first side frame portion 164-1 in the initial state, that is, before the card tray 160 has been inserted into the card connector 1.

The holding member 176 includes an operating portion 176*d* serving as a band-like operation transferring portion which extends to the outside in the transverse direction of the card tray 160. The operating portion 176*d* functions as an operation transferring portion which is positioned in the path of the auxiliary member 181 to elastically displace the holding protruding portion 176*a* and disengage the holding engaging opening 65 in the card connector 1. The holding member 176 including the operating portion 176*d* is inclined so that the free end is positioned above the base end in the initial state. Therefore, the operating portion 176*d* is an inclining portion which slopes upward from the rear to the front.

The rest of the configuration for the card tray 160 in the present embodiment is identical to that of the first embodiment so further explanation has been omitted.

The following is an explanation of the operations performed to insert a card tray 160 into the card connector 1 and then eject the tray from the card connector 1.

Figure 9:
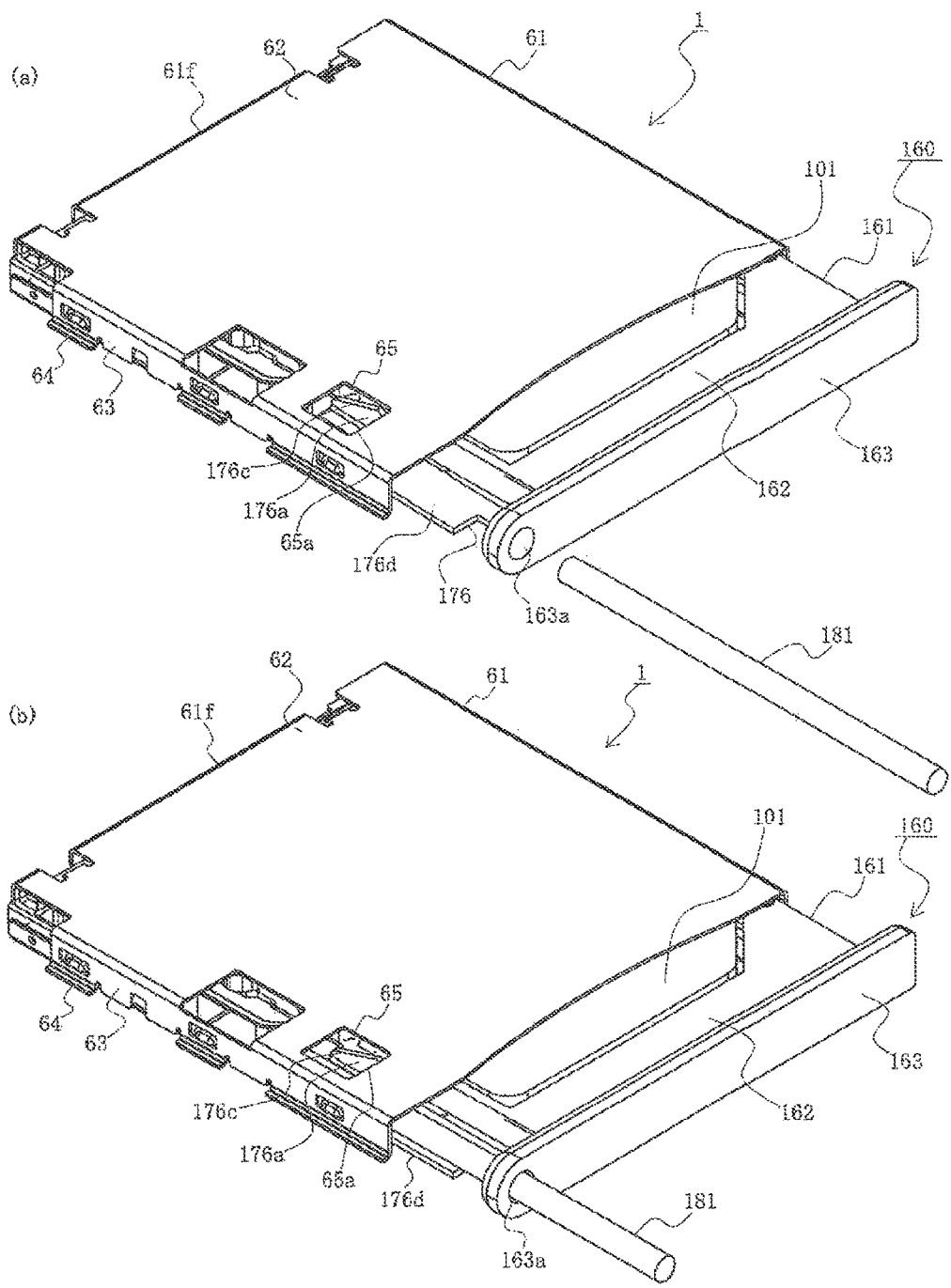
FIG. 9 is a pair of partial cross-sectional top views of the card connector in the second embodiment of the present disclosure showing the operations performed to eject the card tray in which (a) and (b) are views of the steps performed.

FIG. 9 is a pair of partial cross-sectional top views of the card connector in the second embodiment of the present disclosure showing the operations performed to eject the card tray. In the drawing, (a) and (b) are views of the steps performed.

First, the operations performed when the card tray 160 is inserted will be explained. As shown in FIG. 8, the user manually places a card tray 160 containing a card 101 close to the insertion slot 18 to the rear of the card connector 1.

When the card tray 160 is inserted via the insertion slot 18 into the card insertion space formed between housing 11 and the shell 61, the forward inclining portion 176*c* in the holding protruding portion 176*a* of the holding member 176 of the card tray 160 comes into contact with the ceiling panel portion 62 in the rear end portion 61*r* of the shell 61 of the card connector 1. Because the forward inclining portion 176*c* inclines upward from the front to the rear, the holding protruding portion 176*a* is elastically displaced downward as the card tray 160 moves forward with the forward inclining portion 176*c* in contact with the ceiling panel portion 62.

At this time, the card tray 160 encounters resistance caused primarily by the spring action of the elastically deformed holding member 176, but the resistance is not as great as the force applied manually by the user and the tray moves forward despite the resistance.

Next, as the user continues to push in the card tray 160, the card tray 160 reaches a predetermined position in the card connector 1. At this time, the force output portion 21*a* of the ejection lever 21 presses against the front end 161*f* and is further displaced in the direction of the front end portion 11*f*. As a result, the force input portion 21*b* of the ejection lever 21 is further displaced in the direction of the rear end portion 11*r*, and the push rod 22 slides towards its closest position to the rear end portion 11*r*. Even when the push rod 22 is closest to the rear end portion 11*r*, the operating portion 22*a* is positioned further forward than the operating portion 176*d* of the card tray 160, that is, closer to the front end portion 11*f*.

When the card tray 160 reaches a predetermined position in the card connector 1, the rearward inclining portion 176*b* in the holding protruding portion 176*a* of the holding member 176 comes into contact with the engaging edge portion 65*a* of the holding engaging opening 65 in the card connector 1. Because the rearward inclining portion 176*b* inclines downward from front to rear, it is pushed forward from the engaging edge portion 65*a* after coming into contact with the engaging edge portion 65*a* by the spring action of the holding member 176 trying to return to its original shape. Therefore, the card tray 160 is stably held in the predetermined position and is kept from being displaced from the predetermined position in the direction of the rear end portion 11*r*.

The rest of the operations performed to insert the card tray 160 are identical to those performed in the first embodiment so further explanation has been omitted.

The following is an explanation of the operations performed to eject the card tray 160 from the card connector 1. First, as shown in FIG. 9 (*a*), the user manually operates the auxiliary member 181, and the auxiliary member 181 is inserted into the through-hole 163*a* formed in the rear panel portion 163 to the rear of the card tray 160.

Next, because the operating portion 176*d* of the card tray 160 is located in the path of the auxiliary member 181, when the user pushes the auxiliary member 181 forward, the auxiliary member 181 comes into contact with the operating portion 176*d* and the operating portion 176*d* is displaced upwards. Because, at this time, the operating portion 176*d* is inclined upwards moving from the rear to the front, as the auxiliary member 181 moves forward while in contact with the operating portion 176*d*, the holding protruding portion 176*a* integrated with the operating portion 176*d* is smoothly displaced downward. In this way, the holding protruding portion 176*a* can be disengaged from the holding engaging opening 65 in the card connector 1, and the card tray 160 can be displaced from the predetermined position towards the rear end position 11*r*.

Because the operating portion 176*d* is positioned to the rear of the operating portion 22*a* of the push rod 22, as shown in FIG. 9 (*b*), when the tip of the auxiliary member 181 comes into contact with the operating portion 22*a* and begins to force the operating portion 22*a* forward, the operating portion 176*d* has already been displaced downward by the auxiliary member 181 and the holding protruding portion 176*a* has already disengaged from the holding engaging opening 65.

When the user pushes in the auxiliary member 181 further, the push rod 22 reaches its furthest point of advance, the front end 161 presses against the force output portion 21*a* of the ejection lever 21, and the card tray 160 is displaced from the predetermined position towards the rear end portion 11*r*. Because the holding protruding portion 176*a* is disengaged from the holding engaging opening 65, the card tray 160 can be smoothly displaced from the predetermined position towards the rear end portion 11*r*.

In this way, the rear panel portion 163 protrudes sufficiently from the insertion slot 18 in the card connector 1. This allows the user to manually grasp the rear panel portion 163 and remove the card tray 160 from the card connector 1.

The rest of the operations performed to eject the card tray 160 are identical to those performed in the first embodiment so further explanation has been omitted.

In the present embodiment, the frame portion 161 includes a side frame portion 164 facing the side ends 111s of the card 101, and the holding member 176 is a cantilevered plate spring positioned on the side frame portion 164 which includes a holding protruding portion 176a for engaging the holding engaging opening 65. The plate spring also includes an integrally formed operating portion 176d, and the holding protruding portion 176a is displaced when the auxiliary member 181 comes into contact with the operating portion 176d.

As a result, the holding member 176 has a simple configuration but is still able to reliably engage and disengage from the holding engaging opening 65.

Because the other effects are identical to those of the first embodiment, further explanation has been omitted.

The following is an explanation of a third embodiment of the present disclosure. The structure is similar to that of the first and second embodiments so explanation of components denoted by the same reference numbers as those used in the previous embodiment has been omitted. Explanation of all operations and effects identical to those of the first and second embodiments has also been omitted.

Figure 10:
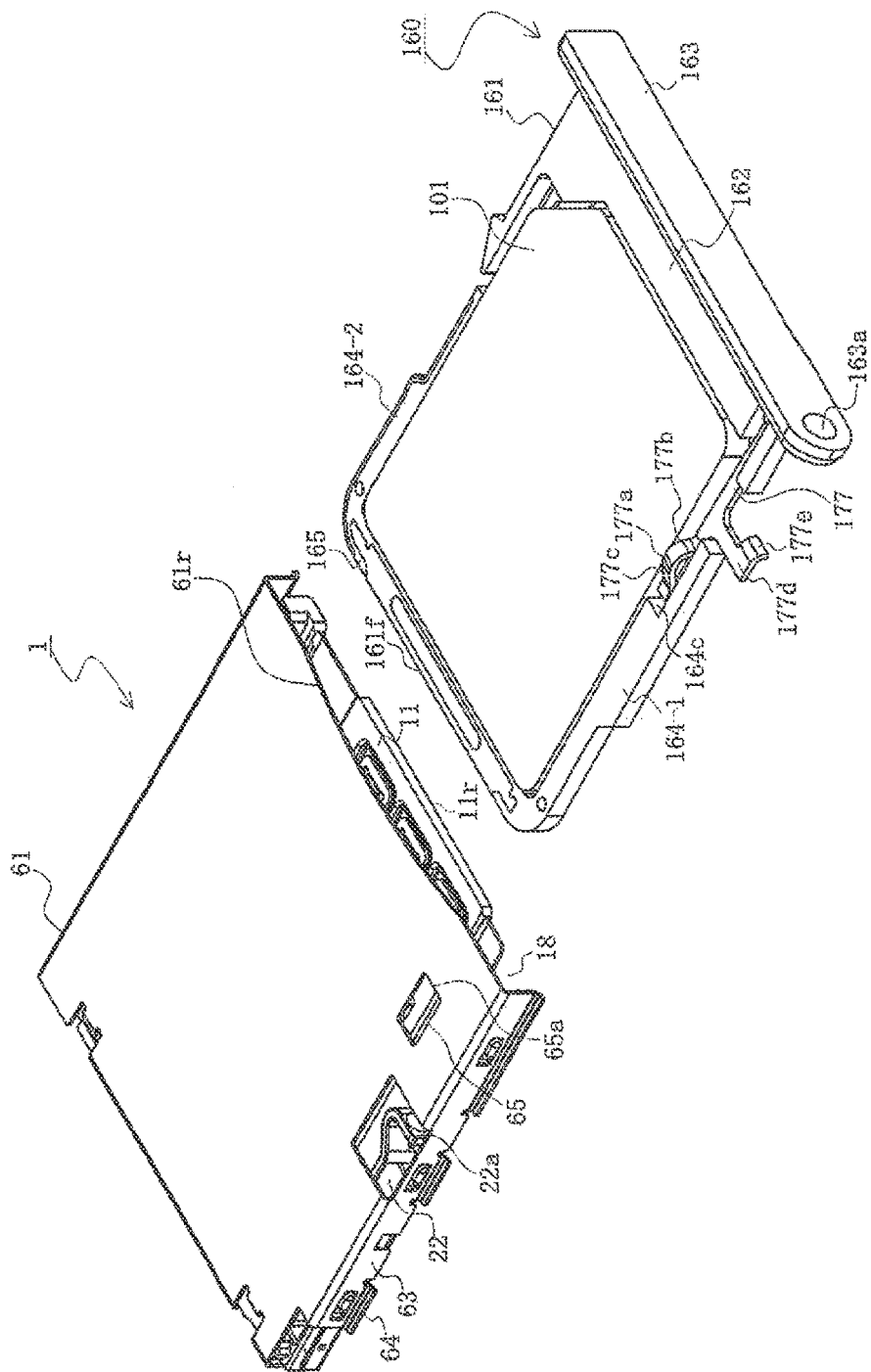
FIG. 10 is a perspective view of the card connector in the third embodiment of the present disclosure showing the situation immediately before the card tray is inserted.

FIG. 10 is a perspective view of the card connector in the third embodiment of the present disclosure showing the situation immediately before the card tray is inserted.

Because the card 101 in the present embodiment is identical to the card 101 in the first embodiment, further explanation has been omitted.

The card connector 1 of the present embodiment does not have a first holding engaging piece 75-1 and a second holding engaging piece 75-2 formed in a first flange portion 71-1 and a second flange portion 71-2. Instead, a holding engaging opening 65 is formed as a fixed lock portion in the ceiling panel portion 62 of the shell 61. The holding engaging opening 65 is positioned above the holding member 177 in the card tray 160 inserted into the card connector 1 as a movable lock portion. The opening is substantially rectangular and passes through the ceiling panel portion 62 in the thickness direction. The edge of the holding engaging opening 65 near the rear end portion 61r functions as an engaging edge portion 65a. Because the rest of the configuration of the card connector 1 in the present embodiment is identical to that of the first embodiment, further explanation has been omitted.

As in the case of the card tray 160 in the first embodiment, the card tray 160 in the present embodiment is formed by punching and bending a metal sheet to obtain the metal portion 151 and at least a portion is integrally coated with an insulating resin using a molding technique such as insert molding or overmolding. However, it differs from the card tray 160 in the first embodiment in that there is no first holding member 175-1, second holding member 175-2, or operating portion 168, and in that there is a holding member 176 serving as the movable lock portion for holding the card tray 160 inserted into the card connector 1.

The holding member 177 has the same function as the holding member 176 in the second embodiment and resembles the configuration of the holding member 176. However, there are some differences in the configuration. More specifically, the holding member 177 is a metal band with spring action which extends in the longitudinal direction with the base end fixed to the rear end portion of the first side frame portion 164-1, that is, the portion connected to the rear frame portion 162, and the other end is positioned inside a slit-like recessed groove portion 164c formed in the first side frame portion 164-1. The recessed groove portion 164c extends in the longitudinal direction and passes through the first side frame portion 164-1 in the vertical direction. The base end of the holding member 177 may be connected integrally to the metal portion 151. As a result, the holding member 177 functions as a cantilevered plate spring secured at the base end, and is elastically displaced in the thickness direction of the card tray 160, that is, the vertical direction.

The holding member 177 bulges upwardly and a holding protruding portion 177a for engaging the holding engaging opening 65 in the card connector 1 is provided near the free end. More specifically, the bulging portion is formed by bending the band-like holding member 177 upwards near the free end. This forms a rearward inclining portion 177b in the rear and a forward inclining portion 177c in the front. When the card tray 160 has been completely inserted into the card connector 1, the rearward inclining portion 177b engages the engaging edge portion 65a of the holding engaging opening 65. The apex of the holding protrusion 177a projects above the upper surface of the first side frame portion 164-1 in the initial state, that is, before the card tray 160 has been inserted into the card connector 1.

The holding member 177 includes an operating portion 177d serving as a band-like operation transferring portion which extends to the outside in the transverse direction of the card tray 160. The operating portion 177d functions as an operation transferring portion which is positioned in the path of the auxiliary member 181 to elastically displace the holding protruding portion 177a and disengage the holding engaging opening 65 in the card connector 1. The holding member includes an inclining portion 177e positioned in the path of the auxiliary member 181. The inclining portion 177e slopes upward from the rear to the front.

The rest of the configuration for the card tray 160 in the present embodiment is identical to that of the first embodiment so further explanation has been omitted.

The following is an explanation of the operations performed to insert a card tray 160 into the card connector 1 and then eject the tray from the card connector 1.

Figure 11:
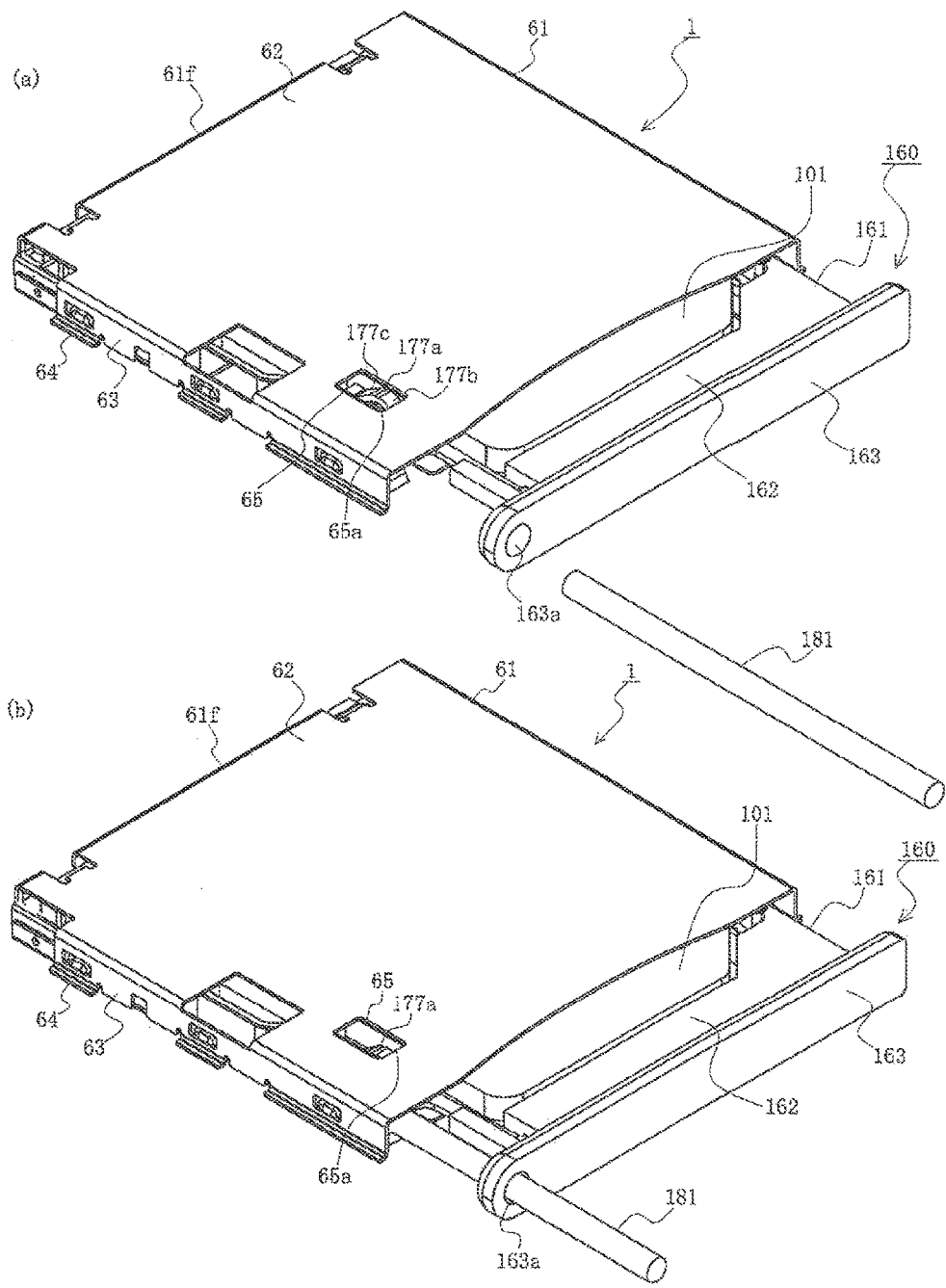
FIG. 11 is a pair of partial cross-sectional top views of the card connector in the third embodiment of the present disclosure showing the operations performed to eject the card tray in which (a) and (b) are views of the steps performed.

FIG. 11 is a pair of partial cross-sectional top views of the card connector in the third embodiment of the present disclosure showing the operations performed to eject the card tray. In the drawing, (a) and (b) are views of the steps performed.

First, the operations performed when the card tray 160 is inserted will be explained. As shown in FIG. 10, the user manually places a card tray 160 containing a card 101 close to the insertion slot 18 to the rear of the card connector 1.

When the card tray 160 is inserted via the insertion slot 18 into the card insertion space formed between housing 11 and the shell 61, the forward inclining portion 177c in the holding protruding portion 177a of the holding member 177 of the card tray 160 comes into contact with the ceiling panel portion 62 in the rear end portion 61r of the shell 61 of the card connector 1. Because the forward inclining portion 177c inclines upward from the front to the rear, the holding protruding portion 177a is elastically displaced downward as the card tray 160 moves forward with the forward inclining portion 177c in contact with the ceiling panel portion 62.

At this time, the card tray 160 encounters resistance caused primarily by the spring action of the elastically deformed holding member 177, but the resistance is not as great as the force applied manually by the user and the tray moves forward despite the resistance.

Next, as the user continues to push in the card tray 160, the card tray 160 reaches a predetermined position in the card connector 1. At this time, the force output portion 21a of the ejection lever 21 presses against the front end 161f and is further displaced in the direction of the front end portion 11f. As a result, the force input portion 21b of the ejection lever 21 is further displaced in the direction of the rear end portion 11r, and the push rod 22 slides towards its closest position to the rear end portion 11r. Even when the push rod 22 is closest to the rear end portion 11r, the operating portion 22a is positioned further forward than the operating portion 177d of the card tray 160, that is, closer to the front end portion 11f.

When the card tray 160 reaches a predetermined position in the card connector 1, the rearward inclining portion 177b in the holding protruding portion 177a of the holding member 177 comes into contact with the engaging edge portion 65a of the holding engaging opening 65 in the card connector 1. Because the rearward inclining portion 177b inclines downward from front to rear, it is pushed forward from the engaging edge portion 65a after coming into contact with the engaging edge portion 65a by the spring action of the holding member 177 trying to return to its original shape. Therefore, the card tray 160 is stably held in the predetermined position and is kept from being displaced from the predetermined position in the direction of the rear end portion 11r.

The rest of the operations performed to insert the card tray 160 are identical to those performed in the first embodiment so further explanation has been omitted.

The following is an explanation of the operations performed to eject the card tray 160 from the card connector 1. First, as shown in FIG. 11 (a), the user manually operates the auxiliary member 181, and the auxiliary member 181 is inserted into the through-hole 163a formed in the rear panel portion 163 to the rear of the card tray 160.

Next, because the inclining portion 177e of the operating portion 177d of the card tray 160 is located in the path of the auxiliary member 181, when the user pushes the auxiliary member 181 forward, the auxiliary member 181 comes into contact with the inclining portion 177e and the operating portion 177d including the inclining portion 177e is displaced upwards. Because, at this time, the inclining portion 177e is inclined upwards moving from the rear to the front, as the auxiliary member 181 moves forward while in contact with the inclining portion 177e, the holding protruding portion 177a integrated with the operating portion 177d is smoothly displaced downward. In this way, the holding protruding portion 177a can be disengaged from the holding engaging opening 65 in the card connector 1, and the card tray 160 can be displaced from the predetermined position towards the rear end position 11r.

Because the operating portion 177d is positioned to the rear of the operating portion 22a of the push rod 22, as shown in FIG. 11 (b), when the tip of the auxiliary member 181 comes into contact with the operating portion 22a and begins to force the operating portion 22a forward, the operating portion 177d has already been displaced downward by the auxiliary member 181 and the holding protruding portion 177a has already disengaged from the holding engaging opening 65.

When the user pushes in the auxiliary member 181 further, the push rod 22 reaches its furthest point of advance, the front end 161 presses against the force output portion 21a of the ejection lever 21, and the card tray 160 is displaced from the predetermined position towards the rear end portion 11r. Because the holding protruding portion 177a is disengaged from the holding engaging opening 65, the card tray 160 can be smoothly displaced from the predetermined position towards the rear end portion 11r.

In this way, the rear panel portion 163 of the card tray 160 protrudes sufficiently from the insertion slot 18 in the card connector 1. This allows the user to manually grasp the rear panel portion 163 and remove the card tray 160 from the card connector 1.

The rest of the operations performed to eject the card tray 160 are identical to those performed in the first embodiment so further explanation has been omitted.

In the present embodiment, the frame portion 161 includes a side frame portion 164 facing the side ends 111s of the card 101, and the holding member 177 is a cantilevered plate spring positioned on the side frame portion 164 which includes a holding protruding portion 177a for engaging the holding engaging opening 65. The plate spring also includes an integrally formed operating portion 177d, and the holding protruding portion 177a is displaced when the auxiliary member 181 comes into contact with the operating portion 177d.

As a result, the holding member 177 has a simple configuration but is still able to reliably engage and disengage from the holding engaging opening 65.

Because the other effects are identical to those of the first and second embodiments, further explanation has been omitted.

The following is an explanation of a fourth embodiment of the present disclosure. The structure is similar to that of the first through third embodiments so explanation of components denoted by the same reference numbers as those used in the previous embodiment has been omitted. Explanation of all operations and effects identical to those of the first through third embodiments has also been omitted.

Figure 12:
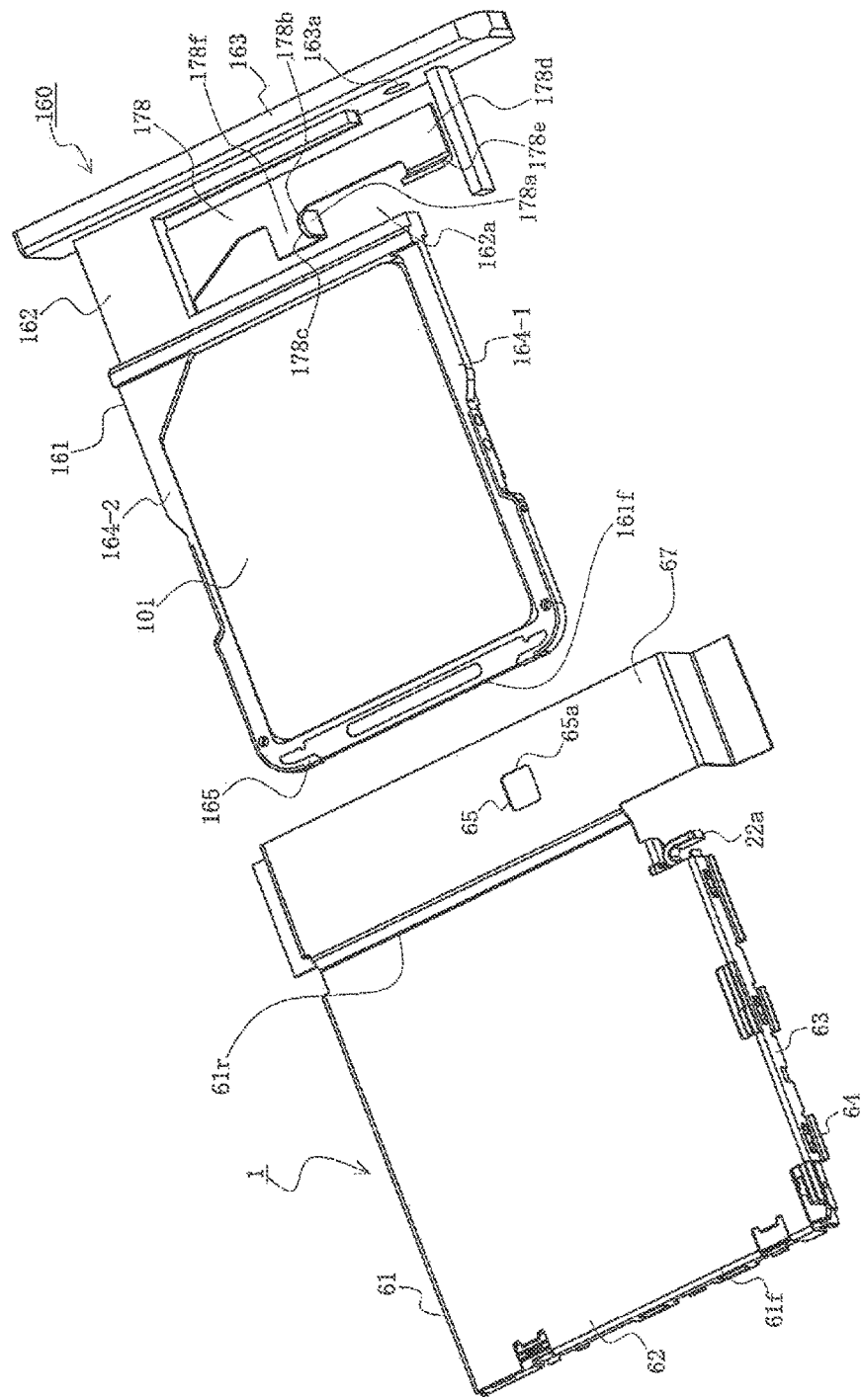
FIG. 12 is a perspective view of the card connector in the fourth embodiment of the present disclosure showing the situation immediately before the card tray is inserted.

FIG. 12 is a perspective view of the card connector in the fourth embodiment of the present disclosure showing the situation immediately before the card tray is inserted.

Because the card 101 in the present embodiment is identical to the card 101 in the first embodiment, further explanation has been omitted.

The card connector 1 of the present embodiment does not have a first holding engaging piece 75-1 and a second holding engaging piece 75-2 formed in a first flange portion 71-1 and a second flange portion 71-2. Instead, a holding engaging opening 65 is formed as a fixed lock portion and eaves portion 67 linked to the ceiling panel portion 62 of the shell 61. The eaves portion 67 is linked to the ceiling panel portion 62 so as to protrude to the rear of the rear end portion 61r of the shell 61. The holding engaging opening 65 is positioned above the holding member 178 in the card tray 160 inserted into the card connector 1 as a movable lock portion. The opening is substantially rectangular and passes through the eaves portion 67 in the thickness direction. The rear edge of the holding engaging opening 65 functions as an engaging edge portion 65a. Because the rest of the configuration of the card connector 1 in the present embodiment is identical to that of the first embodiment, further explanation has been omitted.

As in the case of the card tray 160 in the first embodiment, the card tray 160 in the present embodiment is formed by punching and bending a metal sheet to obtain the metal portion 151 and at least a portion is integrally coated with an insulating resin using a molding technique such as insert molding or overmolding. However, it differs from the card tray 160 in the first embodiment in that there is no first holding member 175-1, second holding member 175-2, or operating portion 168, and in that there is a holding member 178 serving as the movable lock portion for holding the card tray 160 inserted into the card connector 1.

The holding member 178 has the same function as the holding member 176 in the second embodiment and the holding member 177 in the third embodiment, and resembles the configuration of these holding members 176, 177. However, there are some differences in the configuration. More specifically, the holding member 178 is a metal band with spring action which extends in the longitudinal direction with the base end fixed to the rear end portion of the second side frame portion 164-2, that is, the portion connected to the rear frame portion 162, and the other end is positioned inside a space 162a formed in the rear frame portion 162. The space 162a is a rectangular space extending in the transverse direction and passing through the rear frame portion 162 in the thickness direction, that is, in the vertical direction. The base end of the holding member 178 may be connected integrally to the metal portion 151. As a result, the holding member 178 functions as a cantilevered plate spring secured at the base end, and is elastically displaced in the thickness direction of the card tray 160, that is, the vertical direction.

The holding member 178 has a protruding portion 178f protruding forward from near the middle section, and a holding protruding portion 178a formed in the protruding portion 178f which bulges upwardly and engages the holding engaging opening portion 65 of the card connector 1. More specifically, the holding protruding portion 178a is formed by bending upwards the side edge portion extending in the longitudinal direction of the band-like projecting portion 178f, and has a rearward inclining portion 178b to the rear and a forward inclining portion 178c in the front. When the card tray 160 has been completely inserted into the card connector 1, the rearward inclining portion 178b engages the engaging edge portion 65a of the holding engaging opening 65. The apex of the holding protruding portion 178a projects above the upper surface of the rear frame portion 162 in the initial state, that is, before the card tray 160 has been inserted into the card connector 1.

The holding member 178 includes an operating portion 178d serving as a band-shaped operation transferring portion which extends over the space 162a to the outside in the transverse direction of the card tray 160. The operating portion 178d is positioned on the free end of the holding member 178, and functions as the operation transferring portion by elastically displacing the holding protruding portion 178a to disengage the holding engaging opening 65 of the card connector 1. The holding member also includes an inclining portion 178e in the path of the auxiliary member 181. The inclining portion 178e is inclined upwards moving forward from the rear.

The rest of the configuration for the card tray 160 in the present embodiment is identical to that of the first embodiment so further explanation has been omitted.

The following is an explanation of the operations performed to insert a card tray 160 into the card connector 1 and then eject the tray from the card connector 1.

Figure 13:
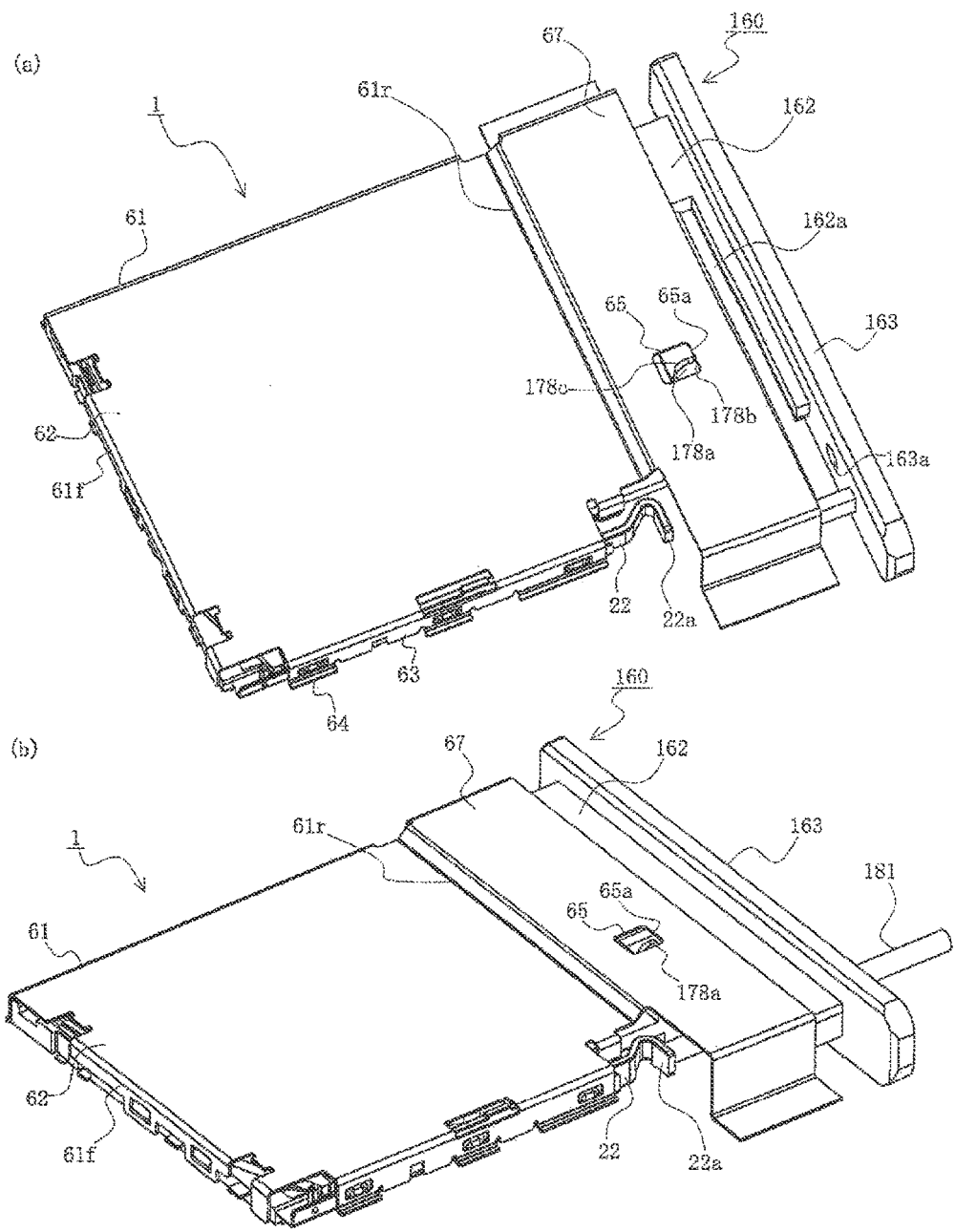
FIG. 13 is a pair of partial cross-sectional top views of the card connector in the fourth embodiment of the present disclosure showing the operations performed to eject the card tray in which (a) and (b) are views of the steps performed.
Figure 14:
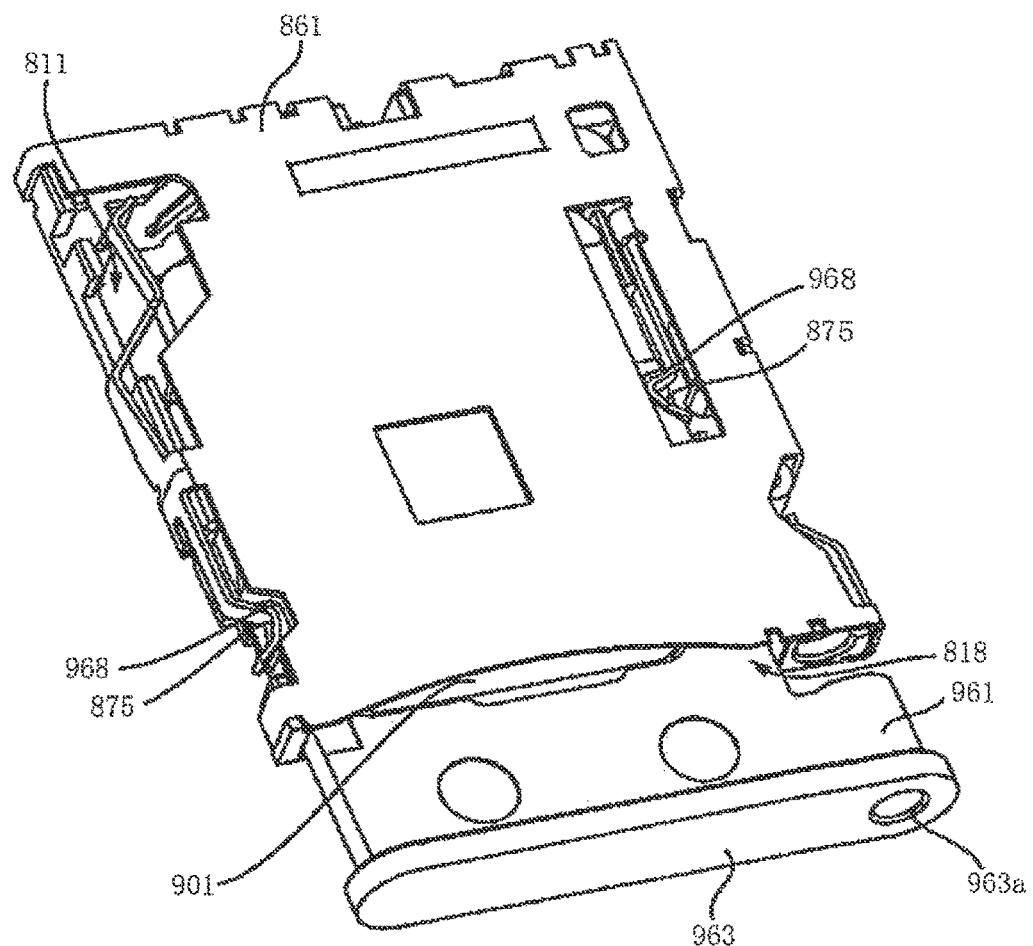
FIG. 14 is a diagram showing a card connector of the prior art.

FIG. 13 is a pair of partial cross-sectional top views of the card connector in the fourth embodiment of the present disclosure showing the operations performed to eject the card tray. In this drawing, (a) and (b) are views of the steps performed.

First, the operations performed when the card tray 160 is inserted will be explained. As shown in FIG. 12, the user manually places a card tray 160 containing a card 101 close to the insertion slot 18 to the rear of the card connector 1.

When the card tray 160 is inserted via the insertion slot 18 into the card insertion space formed between housing 11 and the shell 61, the forward inclining portion 178c in the holding protruding portion 178a of the holding member 178 of the card tray 160 comes into contact with the eaves portion 67 of the card connector 1. Because the forward inclining portion 178c inclines upward from the front to the rear, the holding protruding portion 178a is elastically displaced downward as the card tray 160 moves forward with the forward inclining portion 178c in contact with the eaves portion 67.

At this time, the card tray 160 encounters resistance caused primarily by the spring action of the elastically deformed holding member 178, but the resistance is not as great as the force applied manually by the user and the tray moves forward despite the resistance.

Next, as the user continues to push in the card tray 160, the card tray 160 reaches a predetermined position in the card connector 1 as shown in FIG. 13 (a). At this time, the force output portion 21a of the ejection lever 21 presses against the front end 161f and is further displaced in the direction of the front end portion 11f. As a result, the force input portion 21b of the ejection lever 21 is further displaced in the direction of the rear end portion 11r, and the push rod 22 slides towards its closest position to the rear end portion 11r. Even when the push rod 22 is closest to the rear end portion, the operating portion 22a is positioned further forward than the operating portion 178d of the card tray 160, that is, closer to the front end portion 11f.

When the card tray 160 reaches a predetermined position in the card connector 1, the rearward inclining portion 178b in the holding protruding portion 178a of the holding member 178 comes into contact with the engaging edge portion 65a of the holding engaging opening 65 in the card connector 1. Because the rearward inclining portion 178b inclines downward from front to rear, it is pushed forward from the engaging edge portion 65a after coming into contact with the engaging edge portion 65a by the spring action of the holding member 178 trying to return to its original shape. Therefore, the card tray 160 is stably held in the predetermined position and is kept from being displaced from the predetermined position in the direction of the rear end portion 11r.

The rest of the operations performed to insert the card tray 160 are identical to those performed in the first embodiment so further explanation has been omitted.

The following is an explanation of the operations performed to eject the card tray 160 from the card connector 1. First, the user manually operates the auxiliary member 181, and the auxiliary member 181 is inserted into the through-hole 163a formed in the rear panel portion 163 to the rear of the card tray 160.

Next, because the inclining portion 178e of the operating portion 178d of the card tray 160 is located in the path of the auxiliary member 181, when the user pushes the auxiliary member 181 forward, the auxiliary member 181 comes into contact with the inclining portion 178e and the operating portion 178d including the inclining portion 178e is displaced upwards. Because, at this time, the inclining portion 178e is inclined upwards moving from the rear to the front, as the auxiliary member 181 moves forward while in contact with the inclining portion 178e, the holding protruding portion 178a integrated with the operating portion 178d is smoothly displaced downward. In this way, the holding protruding portion 178a can be disengaged from the holding engaging opening 65 in the card connector 1, and the card tray 160 can be displaced from the predetermined position towards the rear end position 11r.

Because the inclining portion 178e of the operating portion 178d is positioned to the rear of the operating portion 22a of the push rod 22, as shown in FIG. 13 (b), when the tip of the auxiliary member 181 comes into contact with the operating portion 22a and begins to force the operating portion 22a forward, the operating portion 178d has already been displaced downward by the auxiliary member 181 and the holding protruding portion 178a has already disengaged from the holding engaging opening 65.

When the user pushes in the auxiliary member 181 further, the push rod 22 reaches its furthest point of advance, the front end 161 presses against the force output portion 21a of the ejection lever 21, and the card tray 160 is displaced from the predetermined position towards the rear end portion 11r. Because the holding protruding portion 178a is disengaged from the holding engaging opening 65, the card tray 160 can be smoothly displaced from the predetermined position towards the rear end portion 11r.

In this way, the rear panel portion 163 of the card tray 160 protrudes sufficiently from the insertion slot 18 in the card connector 1. This allows the user to manually grasp the rear panel portion 163 and remove the card tray 160 from the card connector 1.

The other operations performed when the card tray 160 is ejected are the same as those performed in the first embodiment so further explanation has been omitted.

In the present embodiment, the frame portion 161 includes a rear frame portion 162 facing the rear end 111r of the rear frame portion 162, and the holding member 178 is a cantilevered plate spring arranged on the rear frame portion 162 and includes a holding protruding portion 178a which engages the holding engaging opening 65.

In this way, the holding member 178 has a simple configuration while also enabling the holding engaging opening 65 to be reliably engaged and disengaged.

Because all of the other effects are the same as those of the first through third embodiments, further explanation has been omitted.

The present disclosure is not restricted to these embodiments. Other variations based on the spirit of the present disclosure are possible and these are not excluded from the scope of the present disclosure.

The present disclosure can be applied to card holding members and card connectors.

The invention claimed is:

1. A card holding member which is configured to hold a card having terminal members and which is configured to be inserted into, and ejected from, a card connector having a lock portion and an ejection mechanism, the card holding member comprising:
   a frame portion having a front frame portion, a rear frame portion, and first and second side frame portions, the first side frame portion connecting first ends of the front and rear frame portions, the second side frame portion connecting second ends of the front and rear frame portions, the frame portion defining a space therebetween which is configured to accommodate the card; and
   a movable lock portion mounted in a rear portion of the frame portion, the movable lock portion configured to engage the lock portion of the card connector upon the card holding member being inserted into the card connector, the movable lock portion configured to disengage the lock portion of the card connector upon the card holding member being ejected from the card connector by the ejection mechanism.

2. The card holding member according to claim 1, wherein the movable lock portion is a cantilevered plate spring, wherein the cantilevered plate spring includes a holding protruding portion that is configured to engage and disengage from the lock portion of the card connector.

3. The card holding member according to claim 1, wherein the movable lock portion is mounted in a rear portion of the first side frame portion.

4. The card holding member according to claim 1, wherein the movable lock portion is mounted in the rear frame portion.

5. The card holding member according to claim 1, further comprising an auxiliary movable lock portion mounted in a rear portion of the frame portion, the auxiliary movable lock portion configured to engage an auxiliary lock portion of the card connector upon the card holding member being inserted into the card connector, the auxiliary movable lock portion configured to disengage the auxiliary lock portion of the card connector upon the card holding member being ejected from the card connector by the ejection mechanism.

6. The card holding member according to claim 5, wherein the auxiliary movable lock portion is mounted in a rear portion of the second side frame portion.

7. The card holding member according to claim 1, further comprising an operating portion mounted in the rear portion of the frame portion, wherein, upon the card holding member being ejected from the card connector by the ejection mechanism, the operating portion is configured to engage the movable lock portion, thereby causing the movable lock portion to disengage from the lock portion of the card connector.

8. A combination comprising:
   a card holding member, the card holding member having a frame portion and a movable lock portion, the frame portion having a front frame portion, a rear frame portion, and first and second side frame portions, the first side frame portion connecting first ends of the front and rear frame portions, the second side frame portion connecting second ends of the front and rear frame portions, the frame portion defining a space therebetween which is configured to accommodate a card, the movable lock portion being mounted in a rear portion of the frame portion; and
   a card connector defining a space for receiving the card holding member therein, the card connector having a lock portion and an ejection mechanism,
   wherein, upon the card holding member being inserted into the card connector, the movable lock portion engages the lock portion of the card connector, and
   wherein, upon the card holding member being ejected from the card connector, the movable lock portion disengages from the lock portion of the card connector and the ejection mechanism ejects the card holding member from the card connector.

9. The combination as defined in claim 8, wherein the movable lock portion is a cantilevered plate spring, wherein the cantilevered plate spring includes a holding protruding portion that is configured to engage and disengage from the lock portion of the card connector.

10. The combination according to claim 8, wherein the movable lock portion is mounted in a rear portion of the first side frame portion.

11. The combination according to claim 8, wherein the movable lock portion is mounted in the rear frame portion.

12. The combination according to claim 8, wherein the card holding member further includes an auxiliary movable lock portion mounted in a rear portion of the frame portion, and wherein the card connector further includes an auxiliary lock portion, the auxiliary movable lock portion being configured to engage the auxiliary lock portion upon the card holding member being inserted into the card connector, the auxiliary movable lock portion configured to disengage the auxiliary lock portion upon the card holding member being ejected from the card connector.

13. The combination according to claim 12, wherein the auxiliary movable lock portion is mounted in a rear portion of the second side frame portion.

14. The combination according to claim 8, wherein the card holding member further includes an operating portion mounted in the rear portion of the frame portion, wherein, upon the card holding member being ejected from the card connector by the ejection mechanism, the operating portion is configured to engage the movable lock portion, thereby causing the movable lock portion to disengage from the lock portion of the card connector.

15. The combination according to claim 8, wherein the lock portion of the card connector is an immovable fixed member.

16. The combination according to claim 8, wherein the card connector has a shell, and wherein the lock portion of the card connector is formed as an opening through the shell.

17. A method of securing a card holding member within a card connector, the method comprising the steps of:
providing the card holding member, wherein the card holding member has a frame portion and a movable lock portion, the frame portion having a front frame portion, a rear frame portion, and first and second side frame portions, the first side frame portion connecting first ends of the front and rear frame portions, the second side frame portion connecting second ends of the front and rear frame portions, the frame portion defining a space therebetween which is configured to accommodate a card, the movable lock portion being mounted in a rear portion of the frame portion;
providing the card connector, wherein the card connector defines a space for receiving the card holding member therein, the card connector having a lock portion;
inserting the card holding member into the space of the card connector; and
causing the movable lock portion to engage the lock portion of the card connector.

18. A method of removing a card holding member from a card connector, the method comprising the steps of:
providing the card holding member and the card connector, wherein the card holding member has a frame portion and a movable lock portion, the frame portion having a front frame portion, a rear frame portion, and first and second side frame portions, the first side frame portion connecting first ends of the front and rear frame portions, the second side frame portion connecting second ends of the front and rear frame portions, the frame portion defining a space therebetween which is configured to accommodate a card, the movable lock portion being mounted in a rear portion of the frame portion, wherein the card connector defines a space therein, wherein the card connector has a lock portion and an ejection mechanism, and wherein the card holding member is secured within the space defined by the card connector as the movable lock portion of the card holding member and the lock portion of the card connector are engaged;
providing an auxiliary member;
manipulating the auxiliary member to cause the movable lock portion to disengage from the lock portion of the card connector; and
further manipulating the auxiliary member to cause the ejection mechanism to eject the card holding member from the card connector.

\* \* \* \* \*